(12) United States Patent
Mun et al.

(10) Patent No.: US 6,240,254 B1
(45) Date of Patent: May 29, 2001

(54) ZOOM LENS BARREL DRIVING SYSTEM FOR CAMERA

(75) Inventors: Byung-Jun Mun; Yong-Hag Choi; Nae-Jin Jo; Seon-Ho Lee; Jin-Hwan Kim, all of Kyeongsangnam-do (KR)

(73) Assignee: Samsung Aerospace Industries, Ltd. (KR)

(*) Notice: Subject to any disclaimer, the term of this patent is extended or adjusted under 35 U.S.C. 154(b) by 0 days.

(21) Appl. No.: 09/390,433

(22) Filed: Sep. 7, 1999

(30) Foreign Application Priority Data

| Jul. 9, 1998 | (KR) | ................................................ 98-36729 |
| Oct. 28, 1998 | (KR) | ................................................ 98-20668 |
| Feb. 12, 1999 | (KR) | ................................................ 99-2268 |

(51) Int. Cl.⁷ .................................................. G03B 17/00
(52) U.S. Cl. .................................................. 396/79
(58) Field of Search ................................ 396/79, 80, 81, 396/82, 83

(56) References Cited

U.S. PATENT DOCUMENTS

| 4,534,625 | 8/1985 | Ohnuki .................................. 358/701 |
| 4,936,664 | 6/1990 | Haraguchi et al. . |
| 5,223,873 * | 6/1993 | Tsuboi ..................................... 396/82 |
| 5,602,608 | 2/1997 | Asakura et al. . |
| 5,687,029 | 11/1997 | Omi et al. . |

FOREIGN PATENT DOCUMENTS 07151954   6/1995   (JP) .

\* cited by examiner

*Primary Examiner*—W. B. Perkey
(74) *Attorney, Agent, or Firm*—Alston & Bird LLP

(57) ABSTRACT

A zoom lens barrel driving system for a camera includes a driving source, a magnification controlling unit, and a focus controlling unit. The magnification controlling unit is formed with a plurality of barrels and a plurality of lens groups. The barrels and the lens groups move in an optical axis direction upon receipt of a driving power from the driving source such that magnification continuously varies. The focus controlling unit is formed by the lens groups. The lens groups repeatedly move between a near focal position and an infinite focal position in the optical axis direction in synchronization with variation in the magnification to perform a focus controlling operation.

13 Claims, 32 Drawing Sheets

ZOOM LENS BARREL DRIVING SYSTEM FOR CAMERA

BACKGROUND OF THE INVENTION

1. Field of the Invention

The present invention relates to a zoom camera and, more particularly, to a zoom lens barrel driving system for a lens shutter type camera which can effectively perform the zooming and focusing operations only with one driving source.

2. Description of the Related Art

Generally, compact zoom cameras have a zoom lens barrel driving system with a zooming function of varying magnification, i.e., of varying the focal length of photographing lens, and a focusing function of controlling the focal point in view of the distance between the lens and the object.

Such a zoom lens barrel driving system is disclosed in U.S. Pat. Nos. 4,936,664, 5,602,608 and 5,687,029, respectively.

U.S. Pat. No. 4,936,664 discloses a zoom lens barrel driving system where the zooming and focusing operations are preformed by a zoom motor for varying magnifications and a focus motor for controlling the focus, respectively. FIG. 17 is a graph illustrating the relation of the focal lengths controlled by one driving source to the focal points controlled by another driving source. In the drawing, the horizontal axis line indicates barrel rotation angles, the vertical axis upper-side line indicates focal lengths, and the vertical axis lower-side line indicates focal points. When one motor is driven to vary the focal length, barrel components rotate so that continuous zooming ratio variation occurs from a wide-angle position (Wide) to a telephoto position (Tele) or from the Tele position to the Wide position. In contrast, when another motor is driven to vary the focal point, a focus lever mounted within a shutter block rotates at a predetermined angle within the focusing area to thereby perform the focus controlling operation. In this structure, the zooming and focusing operations are separately performed.

U.S. Pat. No. 5,602,608 discloses a zoom lens barrel system where the zooming, focusing, film winding, and film rewinding operations are performed with one driving source by using separate selection gear mechanisms.

U.S. Pat. No. 5,687,029 also discloses a zoom lens barrel system where the zooming and focusing operations are performed with one driving source. Particularly, in the system, a plurality of grooves are repeatedly formed within the barrel to realize the zooming and focusing areas. FIG. 18 illustrates the relation of the zooming area to the focusing area. In the drawing, the horizontal axis line indicates barrel rotation angles, the vertical axis upper-side line indicates focal lengths, and the vertical axis lower-line indicates focal points. The focusing lengths can be selected step by step at the setting position and the optical field can be realized in accordance with the selected focal lengths. In the optical field realizing area shown in the drawing with a solid line, a front or rear lens group moves along the grooves formed at the barrel so that the focusing position is determined in the area between the near focal point and the infinite focal point.

The zoom lens barrel system disclosed in U.S. Pat. No. 4,936,684 has good efficiency in control because it uses a DC motor having high driving power as the driving source for the zooming operation, and a stepping motor capable of easily providing position-control as the driving source for the focusing operation, but causes an increase in the production cost. The zoom lens barrel system disclosed in U.S. Pat. No. 5,602,608 has a disadvantage in that the complicated structure of the separate selection gear mechanisms is inappropriate for the compact camera use. Furthermore, the zoom lens barrel system disclosed in U.S. Pat. No. 5,687,029 has a disadvantage in that the grooves formed in the barrel affect the operation of the barrel so that inappropriate areas for the photographing optical field are present, making it difficult to perform a continuous zooming operation or to realize a multi-stepped magnification area.

SUMMARY OF THE INVENTION

It is an object of the present invention to provide a camera with a zoom lens barrel driving system which realizes the zooming and focusing operations only with one driving source, resulting in elevated system stability and reduced production cost.

It is another object to provide a camera with a zoom lens barrel driving system which has simple but sophisticated zooming and focusing structures.

It is still another object to provide a camera with a zoom lens barrel driving system which has a minimized size with the smallest number of components.

These and other objects may be achieved by a zoom lens barrel driving system for a camera including a driving source, a magnification controlling unit, and a focus controlling unit. The magnification controlling unit is formed with a plurality of barrels and a plurality of lens groups. The barrels and the lens groups move in an optical axis direction upon receipt of a driving power from the driving source such that the magnification continuously varies. The focus controlling unit is formed with the lens groups. The lens groups repeatedly move between a near focal position and an infinite focal position in the optical axis direction in synchronization with variations in the magnification to perform a focus controlling operation.

For instance, the components of the zoom lens barrel driving system may be specified as follows. A motor is mounted within a camera body as the driving source. A plurality of power transmitting gears is connected to the motor. A lens base is fixed to the camera body. The lens base has an internal periphery with a plurality of female helicoid threads and a plurality of linear guide grooves in an optical axis direction. A barrel idle gear is fixed to the lens base. The barrel idle gear engages the neighboring power transmitting gear to receive driving power from the motor via the power transmitting gears. A helicoid ring has an external periphery with a plurality of male helicoid threads and a plurality of spur gear threads, and an internal periphery with a plurality of female helicoid threads. The male helicoid threads of the helicoid ring engage the female helicoid threads of the lens base such that the helicoid ring rotates and linearly moves in the optical axis direction. The spur gear threads engage threads of the barrel idle gear such that the helicoid ring rotates and linearly moves in the optical axis direction upon receipt of driving power through the barrel idle gear. A guide plate is combined with the helicoid ring. The guide plate rotates relative to the helicoid ring and linearly moves along the linear guide groove of the lens base in the optical axis direction. The guide plate has a front end with a plurality of linear movement guide members extended in the optical axis direction, each with a predetermined length. Each of the linear movement guide members has a side with a plurality of cam surfaces. A zoom ring has an external periphery with a plurality of male helicoid threads. The male helicoid threads of the zoom ring engage the female helicoid threads of the helicoid ring such that the zoom ring linearly moves in the optical axis direction with the guidance of the linear movement guide member. A rear cam is combined with the zoom ring. The rear cam rotates and linearly moves in the optical axis direction in accordance with the movement of the helicoid ring. A rear lens group is mounted within the zoom ring. The rear lens group moves in the optical axis direction in synchronization with the rear cam. A shutter block is fixed to the zoom ring to control the quantity of light. A front lens group is mounted within the shutter block. The front lens group rotates and linearly moves in the optical axis direction. The front lens group is dynamically connected to the shutter block via a coil spring such that the rotation of the front lens group is defined. A cam lever is provided at an eccentric position of the shutter block. The cam lever repeatedly rotates in a predetermined area in synchronization with the focus cam surface of the guide plate. The cam lever has a first rotating arm contacting the focus cam surface and a second rotating arm. The first rotating arm is smaller than the second rotating arm. A focus relay lever is fixed to the front lens group. The focus relay lever repeatedly moves the front lens group in the optical axis direction by a predetermined distance. The second rotating arm is fixed to the focus relay lever. In this structure, the front lens group repeatedly moves between the near focal position and the infinite focal position in the optical axis direction to thereby perform the focus controlling operation.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or the similar components, wherein.

DETAILED DESCRIPTION OF THE PREFERRED EMBODIMENTS

Preferred embodiments of this invention will be explained with reference to the accompanying drawings.

Figure 1:
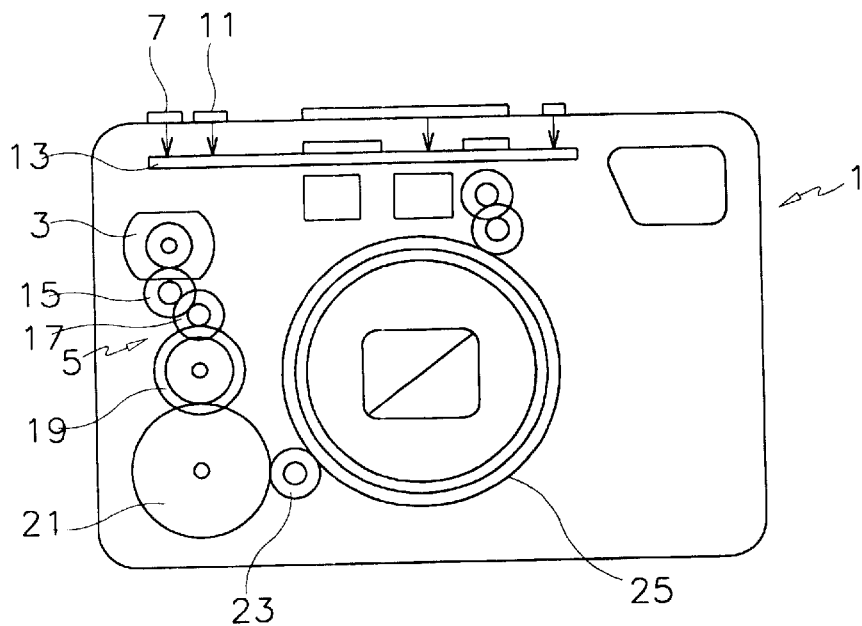
FIG. 1 is a front view of a camera with a zoom lens barrel assembly according to a preferred embodiment of the present invention.
Figure 2:
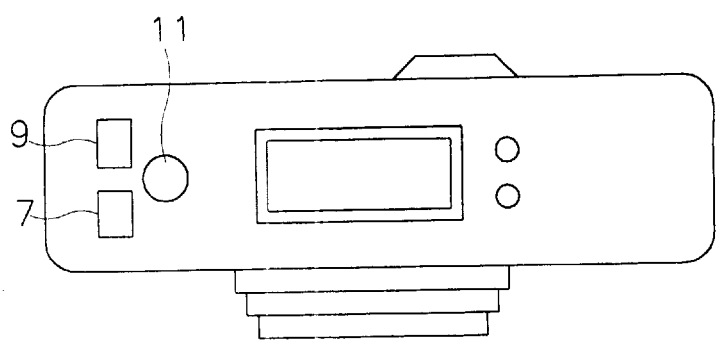
FIG. 2 is a plan view of the camera shown in FIG. 1.

FIG. 1 is a schematic front view of a camera according to a first preferred embodiment of the present invention, and FIG. 2 is a plan view of the camera shown in FIG. 1. The camera includes a camera body 1, a zoom motor 3 placed within the camera body 1 and a speed-reducing gear group 5 connected to the zoom motor 3 to reduce the rotational speed of the zoom motor 3.

A Tele switch (telephoto position controlling switch) 7, a Wide switch (wide-angle position controlling switch) 9, and a release switch 11 are arranged on a top side of the camera body 1. The Tele and Wide switches 7 and 9 are connected to a control printed circuit board 13 which is disposed within the camera body 1 and, in turn, connected to the zoom motor 3. The zoom motor 3 is structured to be bi-directionally rotated in accordance with the operational signals issued from the Tele and Wide switches 7 and 9, thereby performing the zooming and focusing operations simultaneously.

The speed-reducing gear group 5 includes first to fourth speed-reducing gears 15, 17, 19 and 21 which sequentially engage each other. The gear component number of the speed-reducing gear group 5 may increase or decrease so as to be adapted to the respective layout.

A barrel idle gear 23 engages the fourth speed-reducing gear 21 such that it can receive the driving power of the zoom motor 3 via the speed-reducing gear group 6 and transmit it to a zoom lens barrel assembly 25 fixed into the camera body 1.

Figure 3:
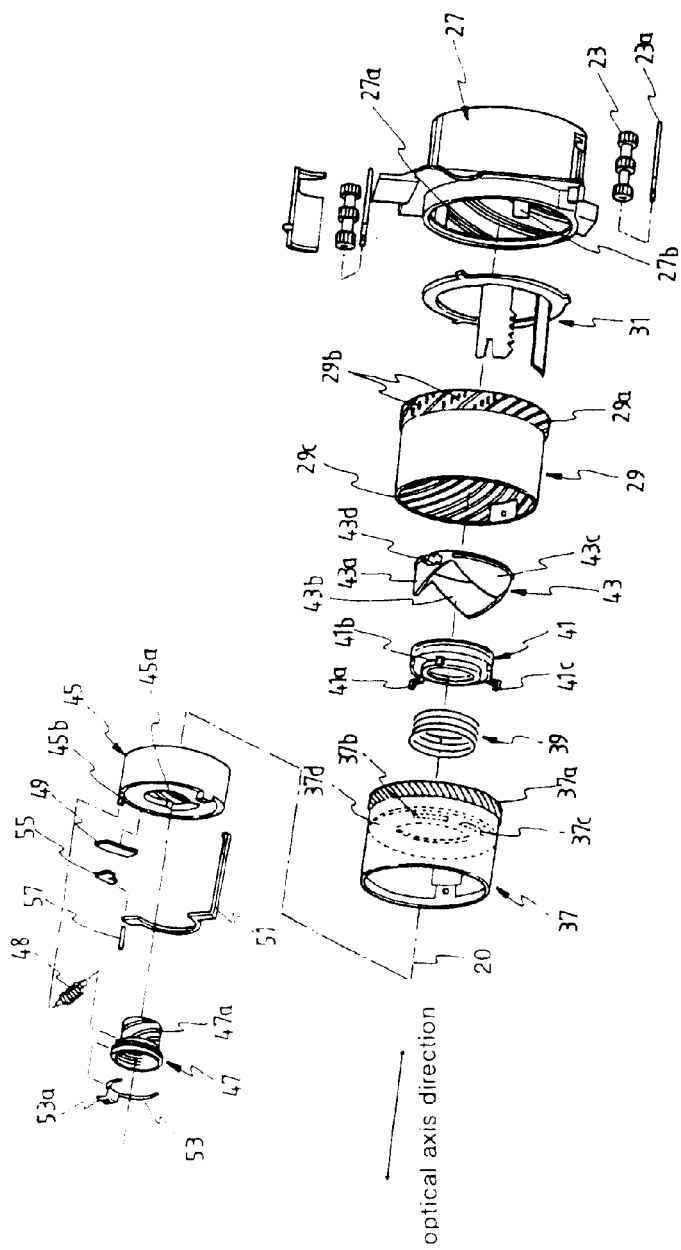
FIG. 3 is an exploded perspective view of the zoom lens barrel assembly shown in FIG. 1 with a helicoid ring, a guide plate, a focus cam lever, and a front lens group.

FIG. 3 is an exploded perspective view of the zoom lens barrel assembly 25 shown in FIG. 1, where the reference numeral 20 indicates an optical axis. As shown in FIG. 3, the zoom lens barrel assembly 25 includes a lens base 27 fixed to the camera body 1. The lens base 27 has an internal periphery with a plurality of female helicoid threads 27a and a plurality of linear guide grooves 27b arranged in the optical axis direction. The barrel idle gear 23 is fixed to a side portion of the lens base 27 via a shaft 23a.

A helicoid ring 29 is inserted into the lens base 27. The helicoid ring 29 has an external periphery with a plurality of male helicoid threads 29a and a plurality of spur gear threads 29b interposed between some of the neighboring male helicoid threads 29a. The male helicoid threads 29a of the helicoid ring 29 engage the female helicoid threads 27a of the lens base 27 to rotate and linearly move the helicoid ring 29 in the optical axis direction. The spur gear threads 29b of the helicoid ring 29 engage the threads of the barrel idle gear 23 to rotate and linearly move the helicoid ring 29 in the optical axis direction upon receipt of the driving power of the zoom motor 3 through the barrel idle gear 23.

The helicoid ring 29 has an internal periphery with a plurality of female helicoid threads 29c.

Figure 4:
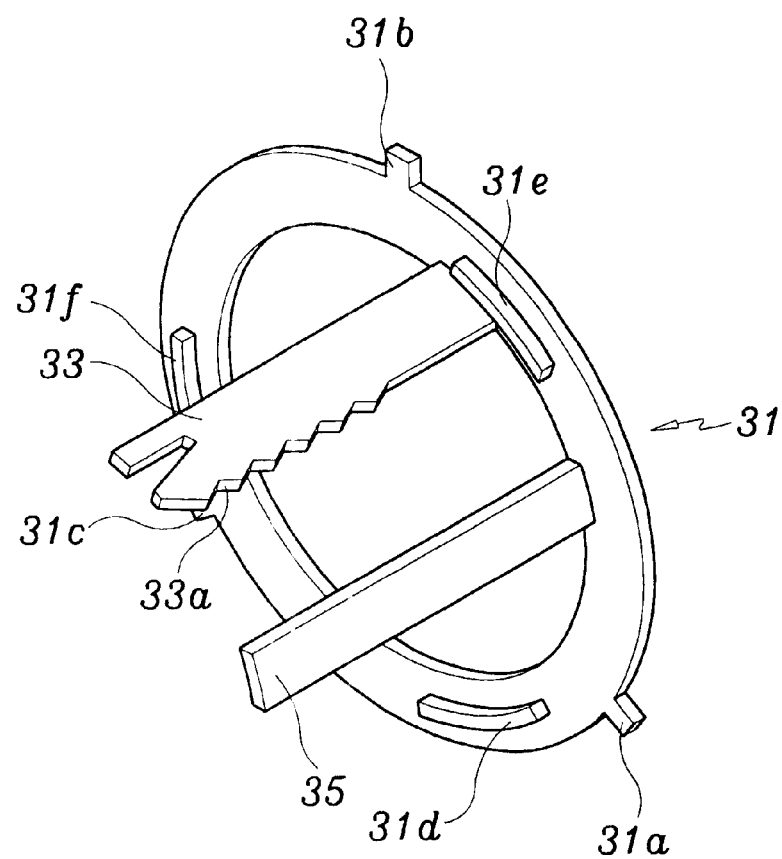
FIG. 4 is an enlarged view of the guide plate shown FIG. 3.

A hoop-shaped guide plate 31 is also inserted into the lens base 27. As shown in FIG. 4, the guide plate 31 has an external periphery with a plurality of linear protrusions 31a, 31b and 31c, a lateral side with a plurality of rotation support protrusions 31d, 31e and 31f, and a plurality of linear movement guide members 33 and 35 protruded from the lateral side in the optical axis direction.

Figure 7:
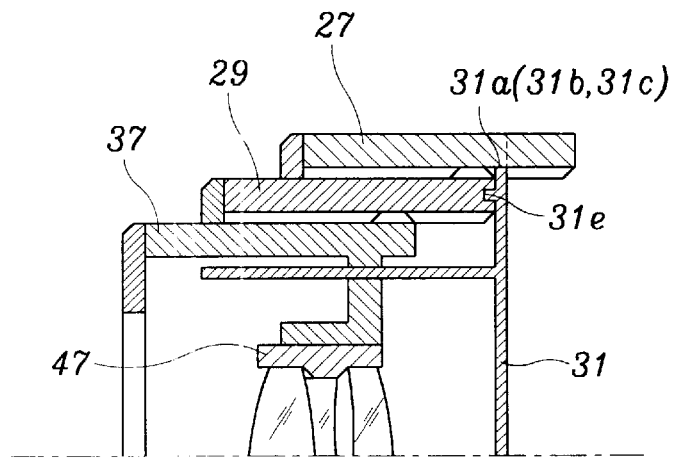
FIG. 7 is a combinatorial section view of the zoom lens barrel assembly shown in FIG. 1 at its Wide state.
Figure 8:
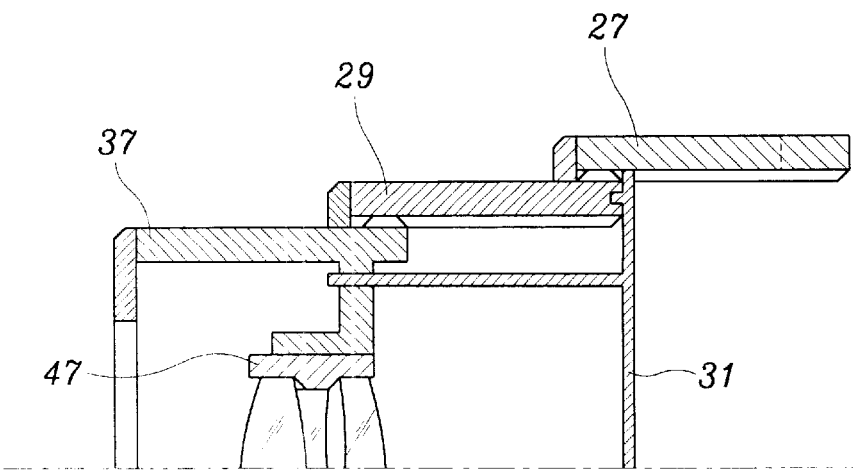
FIG. 8 is a combinatorial section view of the zoom lens barrel assembly shown in FIG. 1 at its Tele state.

The linear protrusions 31a, 31b and 31c are interlocked with the linear guide grooves 27b of the lens base 27 such that they can linearly move in the optical axis direction. As shown in FIGS. 7 and 8, the rotation support protrusions 31d, 31e and 31f are interlocked with grooves of the helicoid ring 29 such that the helicoid ring 29 can rotate with respect to the guide plate 31.

The linear movement guide members 33 and 35 have a role of linearly guiding a zoom ring 37 in the optical axis direction. One of the linear movement guide members 33 and 35 is provided with a focus cam surface 33a composed of a plurality of inclined grooves or threads.

The above referenced zoom ring 37 is inserted into the helicoid ring 29. The zoom ring 37 has an external periphery with a plurality of male helicoid threads 37a at its one end side. The male helicoid threads 37a of the zoom ring 37 engage the female helicoid threads 29c formed at the internal periphery of the helicoid ring 29.

The zoom ring 37 is provided with grooves 37b and 37c for receiving the linear movement guide members 33 and 35 of the guide plate 31 such that it can linearly move in the optical axis direction along with the rotation of the helicoid ring 29.

The room ring 37 is further provided with a partitioning member 37d having a light passage center hole. The grooves 37b and 37c for receiving the linear movement guide members 33 and 35 are formed at the partitioning member 37d.

A coil spring 39, a rear lens frame 41 and a rear cam 43 are sequentially arranged at a film side of the zoom ring 37. The coil spring 39 is designed to pressurize the rear lens frame 41 to the film side. The rear lens frame 41 has an external periphery with a plurality of key protrusions 41a, 41b and 41c such that it can linearly move along the internal periphery of the zoom ring 37 in the optical axis direction. The rear cam 43 has a lateral side with a plurality of cams 43a, 43b and 43c, and an external periphery with a key protrusion 43d such that it can linearly move along a linear movement guide groove (not shown) linearly formed at the internal periphery of the helicoid ring 29 in the optical axis direction.

A shutter block 45 and a front lens frame 47 are arranged at an object side of the partitioning member 37d of the zoom ring 37. The shutter block 45 is fixed to the partitioning member 37d of the zoom ring 37 by using a fixture screw (not shown). An encode printed circuit board 49 is fixed to an object side of the shutter block 45 to sense rotational positions of a focus cam lever 51. The shutter block 45 is provided with a galvano meter having electromagnets and light screening sectors (not shown) such that it can function as a lens shutter.

The shutter block 45 has an internal periphery with a plurality of female helicoid threads 45a.

The front lens frame 47 has an external periphery with a plurality of male helicoid threads 47a which engage the female helicoid threads 45a of the shutter block 45. In this structure, the front lens frame 47 can rotate and linearly move in the optical axis direction.

Figure 12:
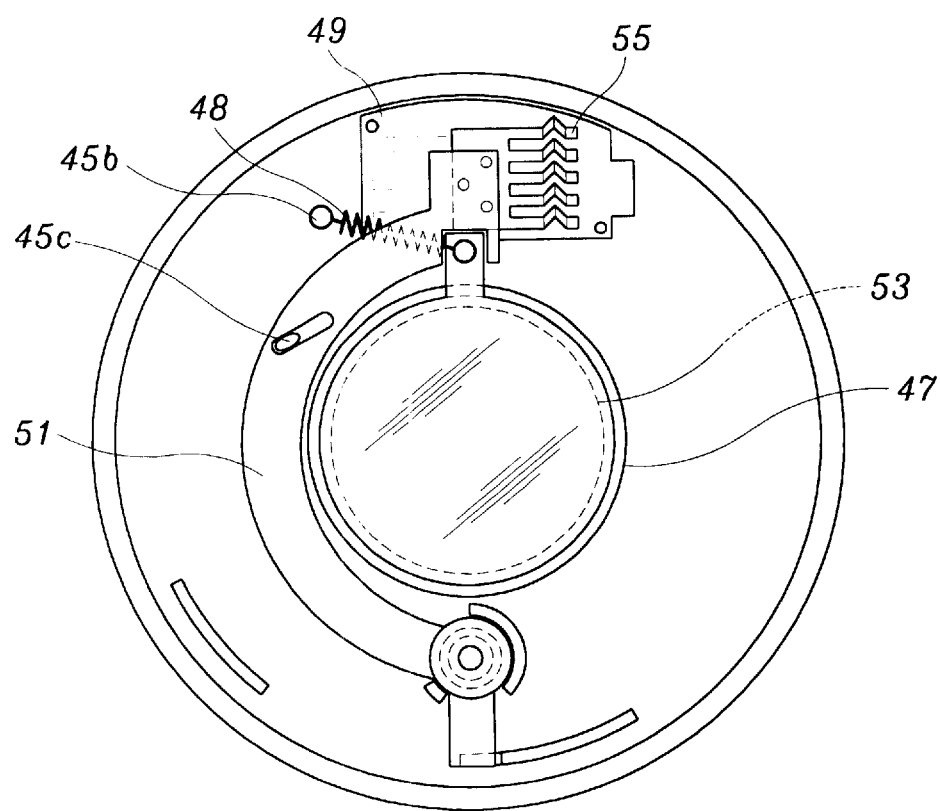
FIG. 12 is a view of the focus cam lever and the front lens group shown in FIG. 3 illustrating their operational relation.

The shutter block 45 is provided with a protrusion 45b for hanging a tensioned coil spring 48 to pull the front lens frame 47 in the predetermined direction and a boss 45c shown in FIG. 12 for ensuring the focus cam lever 51 to be rotated.

Figure 5:
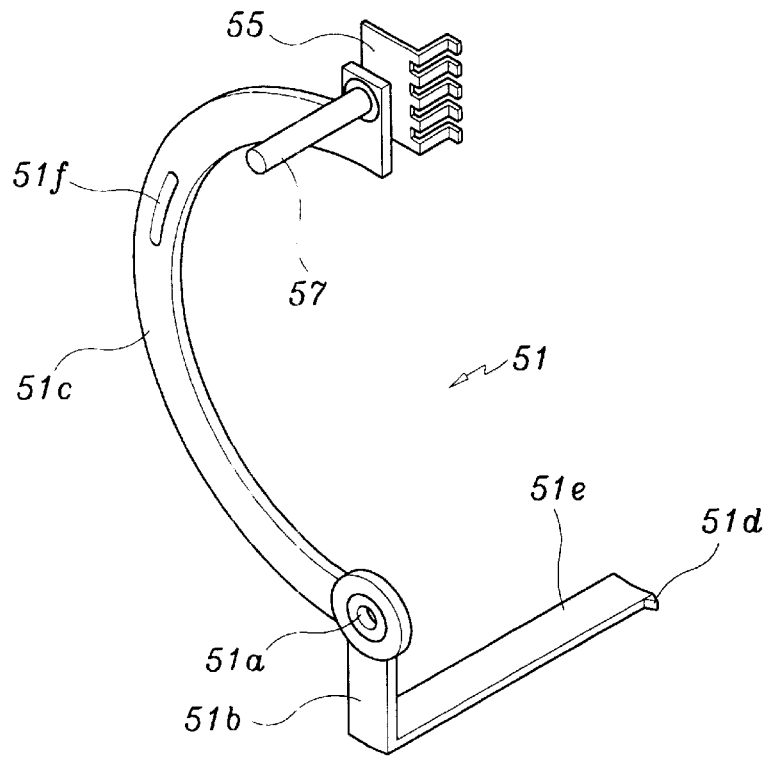
FIG. 5 is an enlarged view of the focus cam lever shown in FIG. 3.
Figure 6:
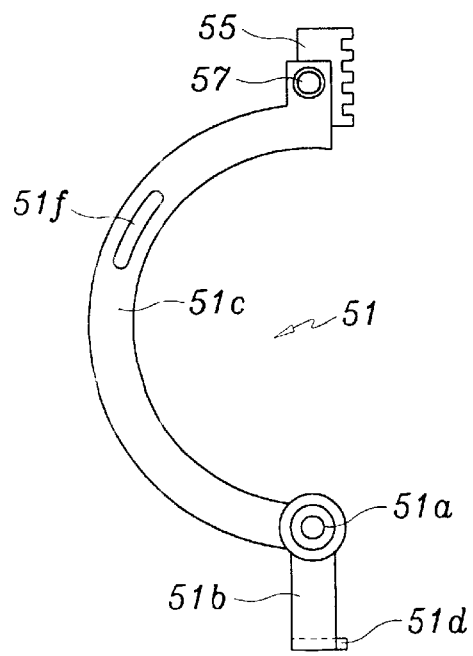
FIG. 6 is a front view of the focus cam lever shown in FIG. 3.

The above referenced focus cam lever 51 is combined with the shutter block 45 such that it can be rotated. In contrast, a focus relay lever 53 is fixed to the front lens frame 47. As shown in FIGS. 5 and 6, the focus cam lever 51 has a short arm 51b and a long arm 51c extended from a rotation center hole 51a. The combination of the focus cam lever 51 with the shutter block 45 is realized at the rotation center hole 51a. A lever 51e is extended from a free end of the short arm 51b in the optical axis direction. The extended lever 51e is provided with a contact protrusion 51d for contacting the focus cam surface 33a of the linear movement guide member 33.

The long arm 51c is formed with a half circle shape to avoid interference with the front lens frame 47. A metallic brush 55 is fixed to a free end portion of the long arm 51c at one side. The metallic brush 55 contacts the encode printed circuit board 49 installed at the shutter block 45 to obtain information about the barrel position. A protruding lever 57 is fixed to the free end portion of the long arm 51c at another side and inserted into a groove 53a of the focus relay lever 53.

The long arm 51c is provided with a slot 51f at its center portion. The slot 51f of the long arm 51c is interlocked with a protrusion 45c formed at the shutter block 45 to ensure that the focus cam lever 51 can be rotated. The focus cam lever 51 is driven by the focus cam surface 33a formed at the linear movement guide member 33 of the guide plate 31.

In operation, when a user pushes a Wide switch 9 at a camera-on state, operational signals issued from the Wide switch 9 are transmitted to the control printed circuit board 13 and the zoom motor 3 rotates in one direction according to the operational signals. The driving power of the zoom motor 3 is applied to the barrel idle gear 23 via the first to fourth speed-reducing gears 15, 17, 19 and 21. The barrel idle gear 23 is engaged with the spur gear 29b formed at the external periphery of the helicoid ring 29 and rotates about the shaft 23a fixed to the lens base 27. In turn, the spur gear 29b rotates and linearly moves the helicoid ring 29 in the optical axis direction. Pursuant to the movement of the helicoid ring 29, the linear protrusions 31a, 31b and 31c of the guide plate 31 move along the linear guide grooves 27b of the lens base 27 in the optical axis direction, and the rotation support protrusions 31d, 31e and 31f of the guide plate 31 make relative rotating movements within the helicoid ring 29 so that the guide plate 31 linearly moves in the optical axis direction. The male helicoid threads 37a formed at the external periphery of the zoom ring 37 move along the female helicoid threads 29c formed at the internal periphery of the helicoid ring 29. At this time, the linear movement guide members 33 and 35 of the guide plate 31 are introduced into the grooves 37b and 37c formed at the zoom ring 37 so that the zoom ring 37 linearly moves in the optical axis direction.

In accordance with the movement of the helicoid ring 29, the key protrusion 43d of the rear cam 43 moves along the linear movement guide groove formed at the internal periphery of the helicoid ring 29 in the optical axis direction so that the rear cam 43 rotates relative to the helicoid ring 29 and linearly moves together with the zoom ring 37 in the optical axis direction. Pursuant to the movement of the rear cam 43, the cams 43a, 43b and 43c of the rear cam 43 move the rear lens frame 41 in the optical axis direction.

When the zoom ring 37 moves, the shutter block 45 and the front lens frame 47 provided in the shutter block 45 move relative to the rear lens frame 41. In this way, when the barrel components are operated while being synchronized with each other, as shown in FIG. 7, the focal length varies to thereby control the zooming ratios.

Meanwhile, when the Tele switch 7 is operated, the same process as with the Wide switch 9 is performed to vary the focal length with the exception that each barrel component, as shown in FIG. 8, sufficiently moves toward the object so that the distance between the front lens frame and the rear lens frame is sufficiently larger than that at the Tele state. Therefore, the focal length varies over the overall ranges of the Wide and Tele states.

The focus controlling operation pursuant to variation in the focal length will be further described below.

Figure 9:
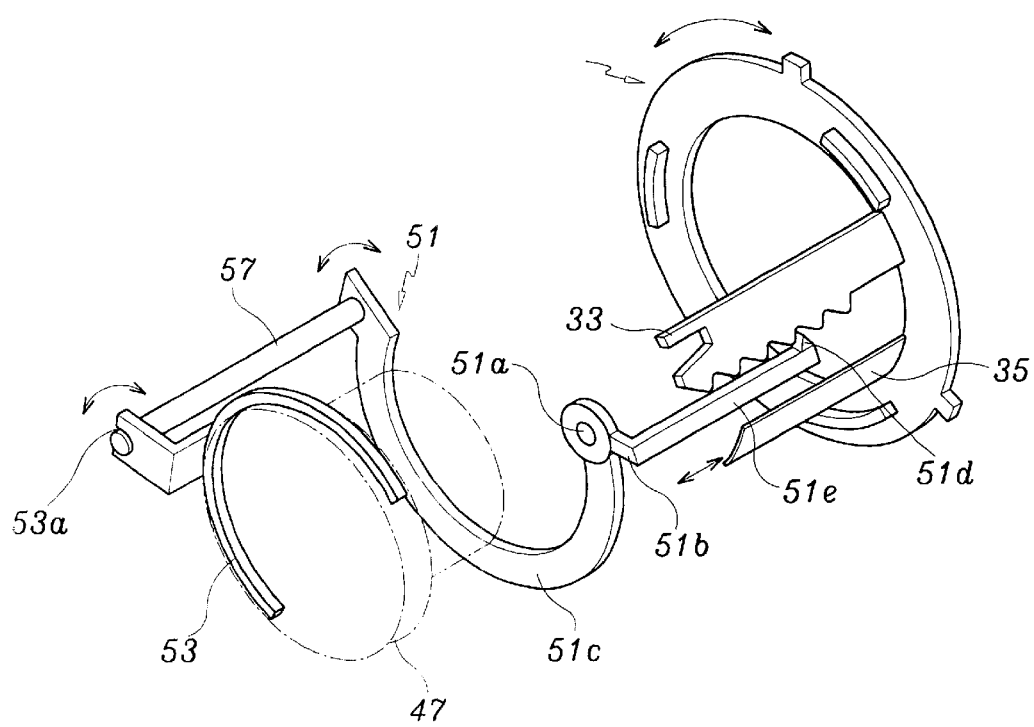
FIG. 9 is a perspective view of the guide plate and the front lens group shown in FIG. 3 illustrating their operational relation at the Wide state.
Figure 10:
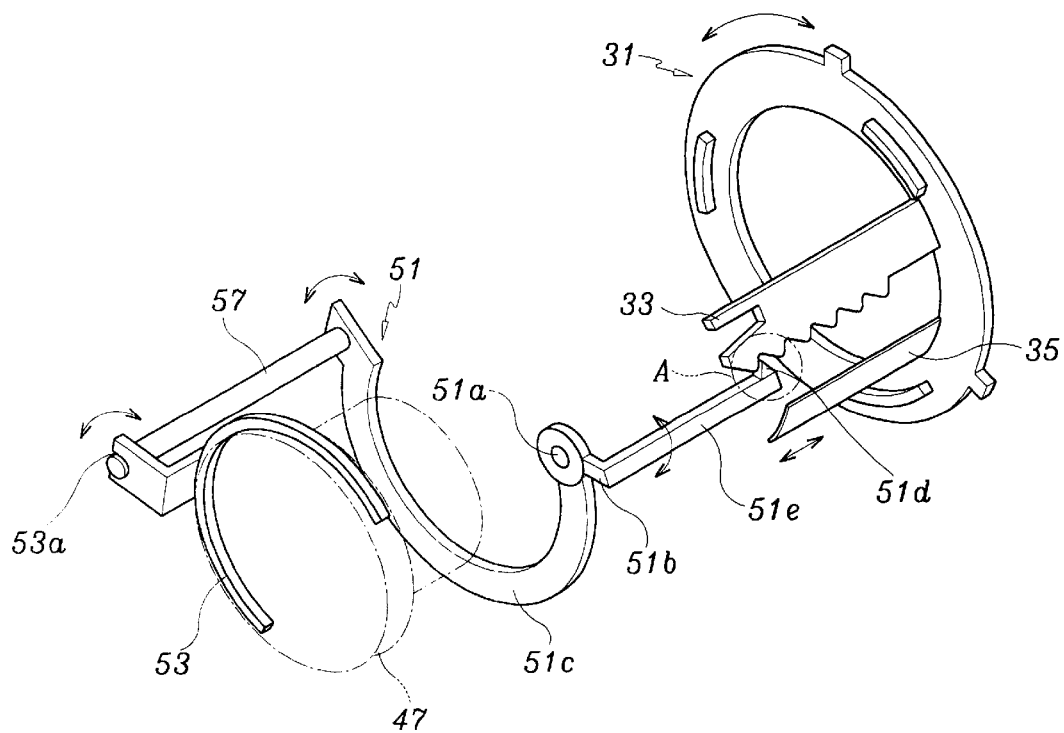
FIG. 10 is a perspective view of the guide plate and the front lens group shown in FIG. 3 illustrating their operational relation at the Tele state.
Figure 11:
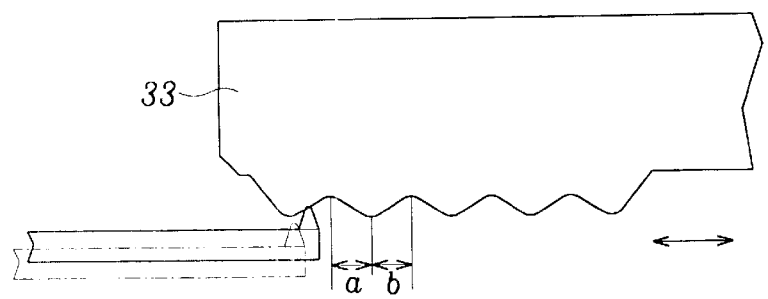
FIG. 11 is an amplified view of the A portion shown in FIG. 10.

FIG. 9 is a perspective view illustrating the operational relations among the guide plate 31, the focus cam lever 51 and the front lens frame 47 at the Wide state. FIG. 10 is a perspective view illustrating the operational relations among the guide plate 31, the focus cam lever 51 and the front lens frame 47 at the Tele state. FIG. 11 is an enlarged view specifically illustrating the contact portion between the focus cam surface 33a and the focus cam lever 51.

Figure 13:
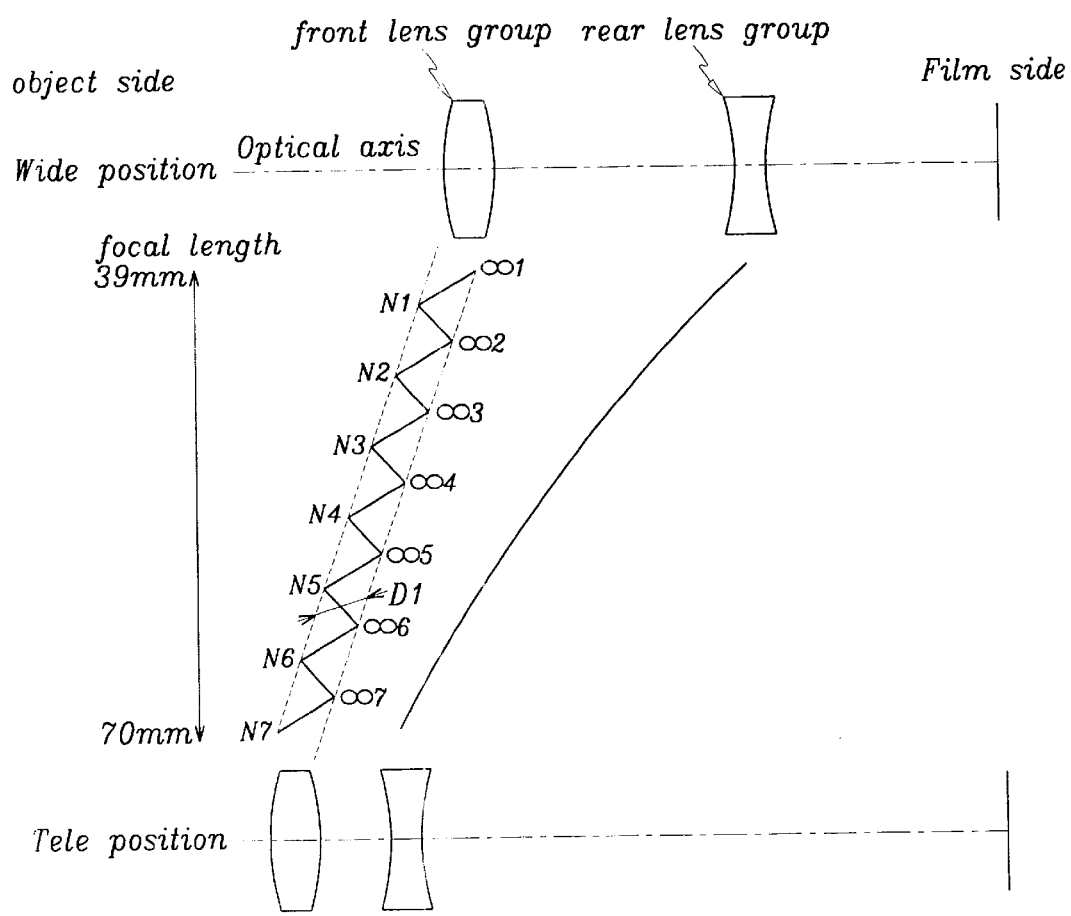
FIG. 13 is a view illustrating the moving route of the front lens group shown in FIG. 3 on the optical axis during the zooming and focusing operations.

When the guide plate 31 moves in the optical axis direction during the focal length varying process, the protrusion 51d formed at the lever 51e extended from the short arm 51b of the focus cam lever 51 in the optical axis direction tightly contacts the focus cam surface 33a of the guide plate 31 so that the focus cam lever 51 rotates around the rotation center hole 51a together with the movement of the guide plate 31. At this time, the focus cam lever 51 rotates by the distance "a" shown in FIG. 11. Then, the long arm 51c of the focus cam lever 51 also rotates and the slot 51f of the long arm 51c is introduced onto the protrusion 45c of the shutter block 45 so that the focus cam lever 51 rotates by a predetermined angle. Together with the rotation of the focus cam lever 51, the protruding lever 57 fixed to the long arm 51c also rotates to, in turn, rotate the focus relay lever 53. When the focus relay lever 53 rotates, the male helicoid threads 47a of the front lens frame 47 move along the female helicoid threads 45 formed at the shutter block 45 in the optical axis direction. At this time, the front lens frame 47 moves toward the object so that the focusing operation is performed from an infinite focal point to a near focal point, i.e., at the range from ∞6 to N5 shown in FIG. 13. In the drawing, the bottom of the thread at the focus cam surface 33a at the finite focal point is indicated by the reference symbol ∞6 and the top of the thread at the near focal point is indicated by N5.

When the guide plate 31 continuously moves toward the object in accordance with the focal length variation, the front lens frame 47 moves from the near focal point to the finite focal point to thereby perform the focusing operation. This operation will be more specifically described below.

As the guide plate 31 further moves toward the object, the tensional coil spring 48 interconnecting the shutter block 45 and the front lens frame 47 pulls the front lens frame 47 toward the initial position. Then, the contact protrusion 51d of the focus cam lever 57 moves by the distance "b", shown in FIG. 11, along the focus cam surface 33a formed at the guide plate 31. At this time, the female helicoid threads 47a formed at the external periphery of the front lens frame 47 move along the female helicoid threads 45a formed at the shutter block 45 to the film side. In this way, the front lens frame 47 moves from the near focal point to the infinite focal point. Accordingly, the front lens frame 47 repeatedly moves by the distance D1 shown in FIG. 13 in accordance with the movement of the guide plate 31 during the focal length varying process so that the focal point can be continuously controlled.

In the meantime, when the focus cam lever 51 rotates for the focusing operation, the brush 55 fixed to the free end of the long arm 51c moves along a top side of the encode printed circuit board 49 fixed to the shutter block 45 to input information about the movement of the barrel components into a separate input member. The input member is to compensate for possible focusing errors due to the focal length variation.

Figure 14:
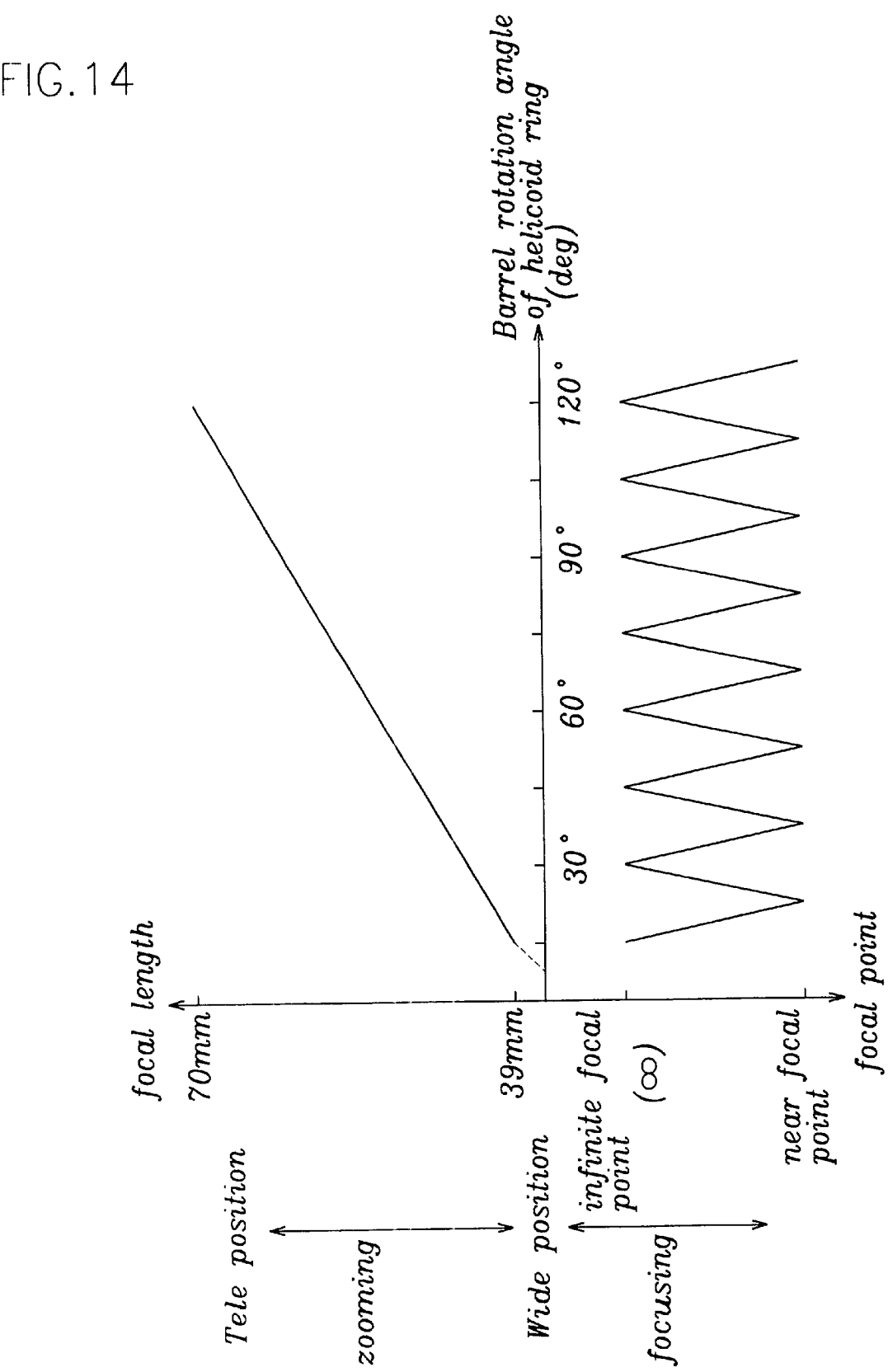
FIG. 14 is a graph illustrating the interrelationship between the focal lengths and the focal points with respect to the barrel rotation angles of the helicoid ring shown in FIG. 3.

FIG. 14 is a graph illustrating the relation of the zooming area to the focusing area. In the drawing, the horizontal axis indicates barrel rotating angle of the helicoid ring 29 while the vertical axis indicates focal length and focal point. The optical field is realized at the overall area in accordance with the focal length variation induced by the movement of the barrel components. As the focus cam lever 51 repeatedly moves from the bottom of the thread formed at the focus cam surface 33a and the top of the thread, the front lens frame 47 moves along the area between the finite focal point and the near focal point so that the focal point can be controlled.

Figure 15:
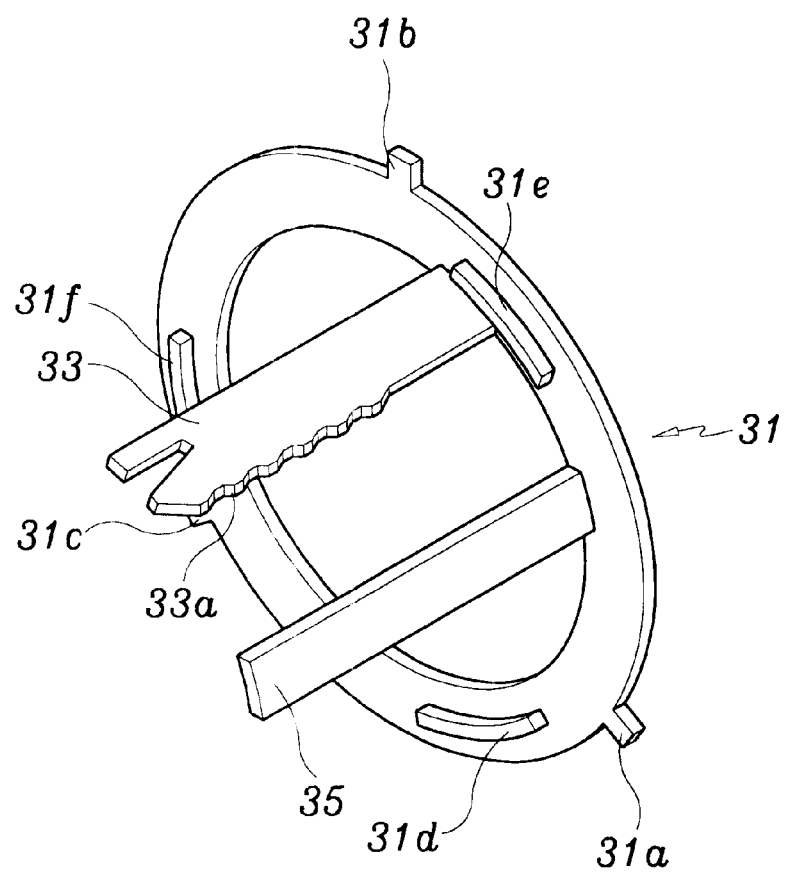
FIG. 15 is a perspective view of a guide plate according to a second preferred embodiment of the present invention.
Figure 16:
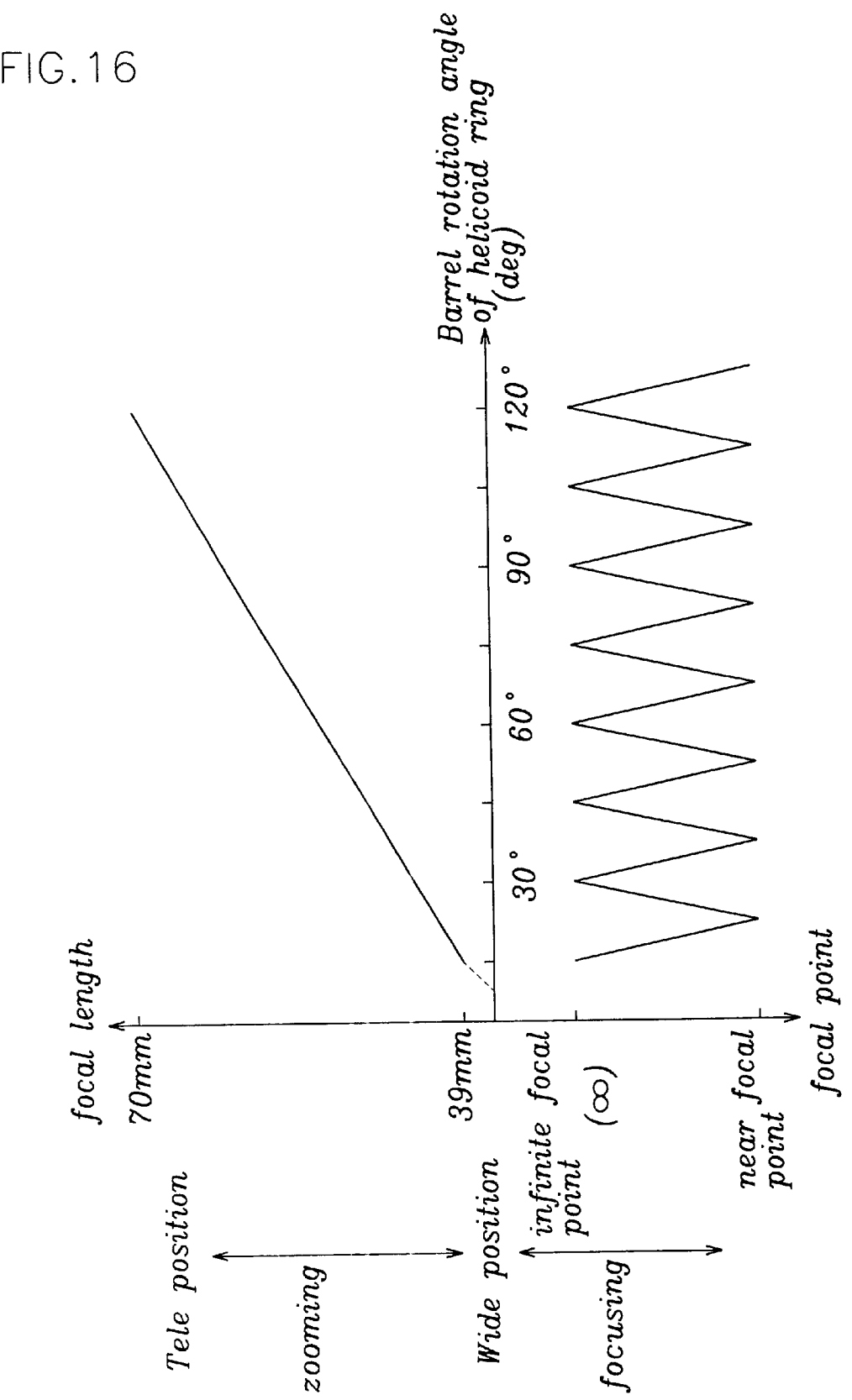
FIG. 16 is a graph illustrating the interrelationship between the focal lengths and the focal points with respect to the barrel rotation angles of a helicoid ring according to the second preferred embodiment.
Figure 17:
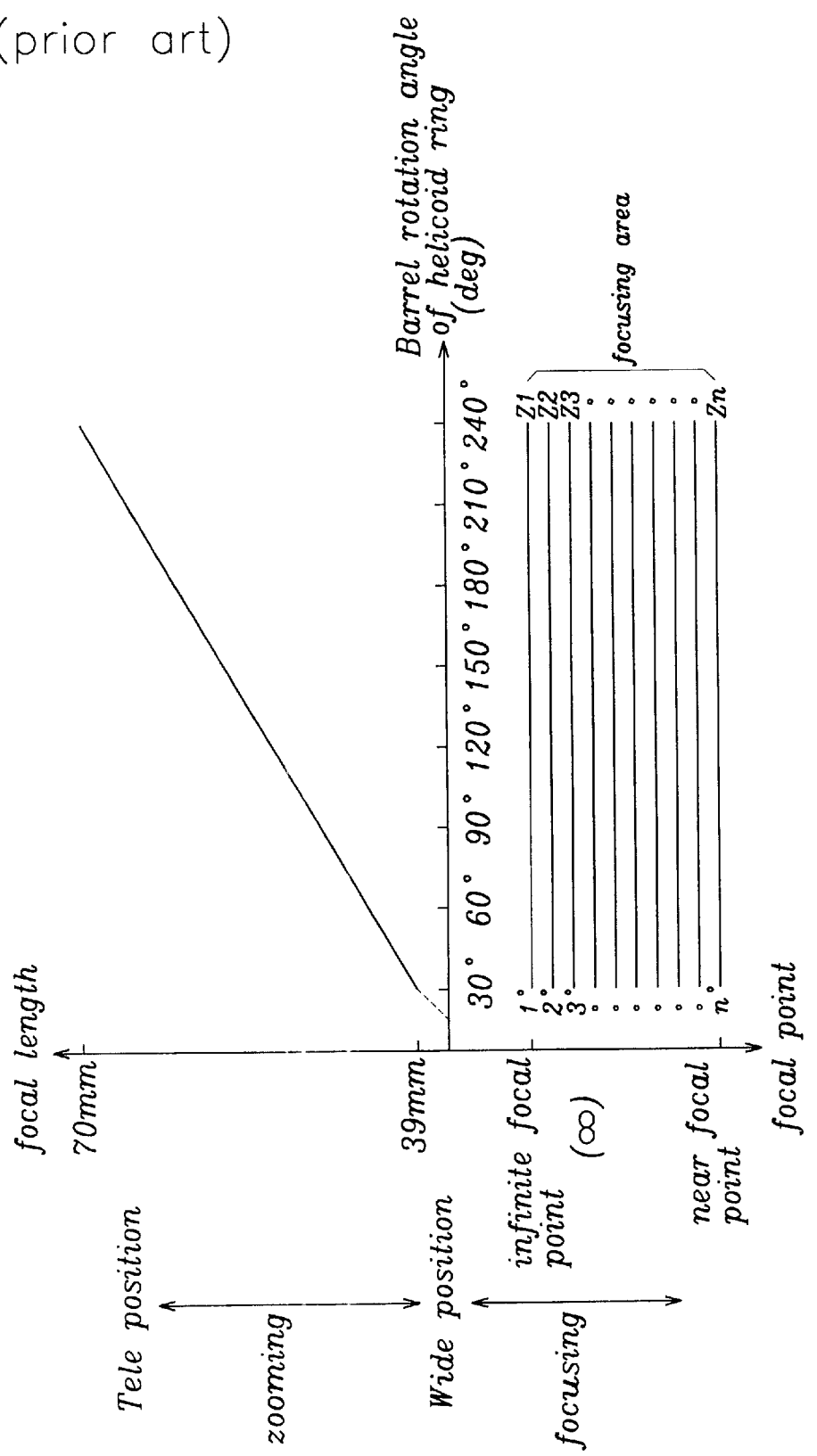
FIG. 17 is a graph illustrating the interrelationship between the focal lengths and the focal points with respect to the barrel rotation angles of a helicoid ring according to a prior art design.
Figure 18:
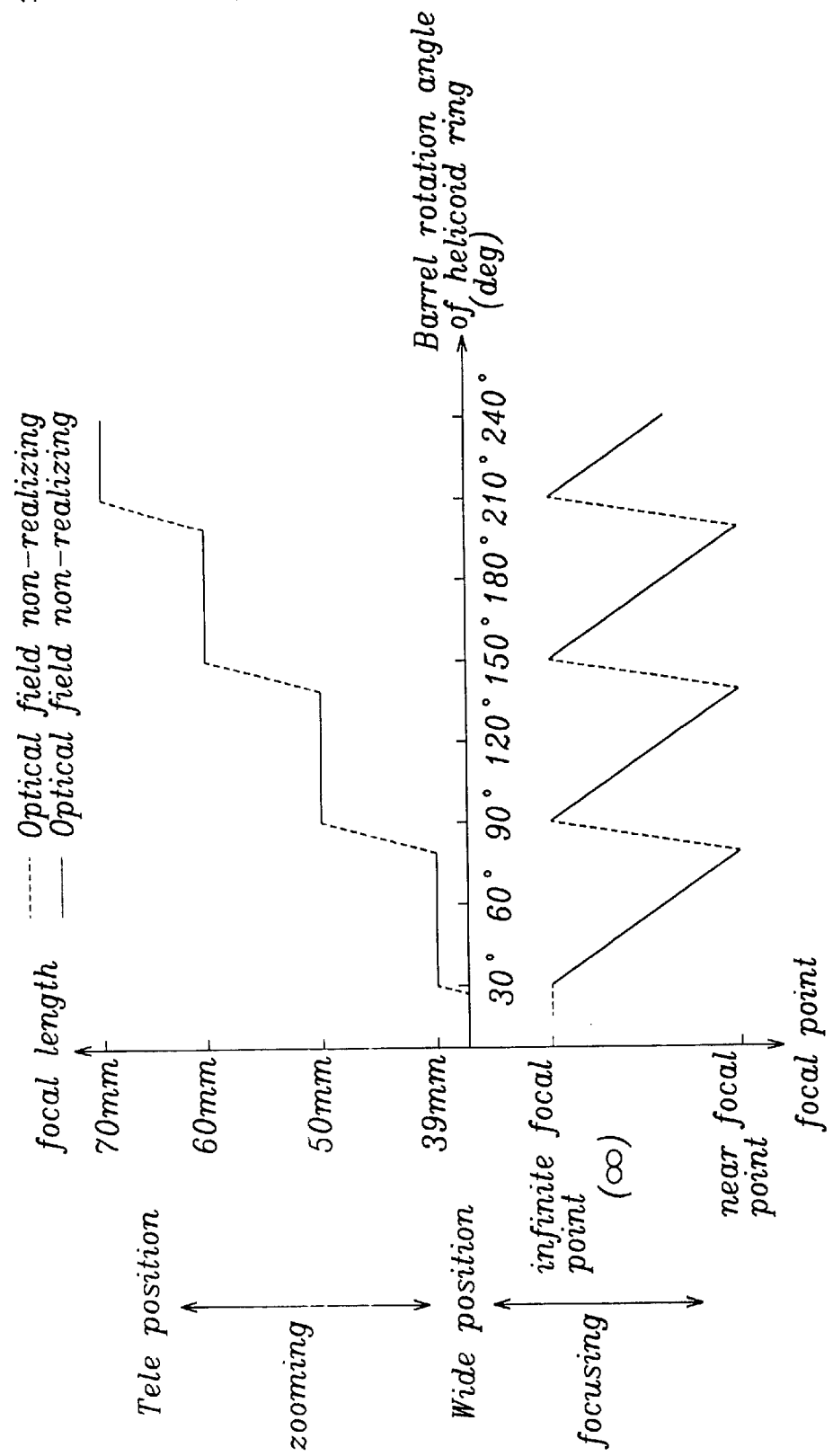
FIG. 18 is a graph illustrating the interrelationship between the focal lengths and the focal points with respect to the barrel rotation angles of a helicoid ring according to another prior art design.

FIG. 15 is a perspective view of a guide plate according to a second preferred embodiment of the present invention. FIG. 16 is a graph illustrating the relation of the zooming area to the focusing area according to the embodiment. In this preferred embodiment, the structure and operation of the camera is the same as in the first preferred embodiment with the exception that the threads formed at the focus cam surface 33a of the guide plate 31 have flat-shaped top and bottom portions. This flat shape helps to more easily control the focusing operation at the infinite focal point and the near focal point.

Figure 19:
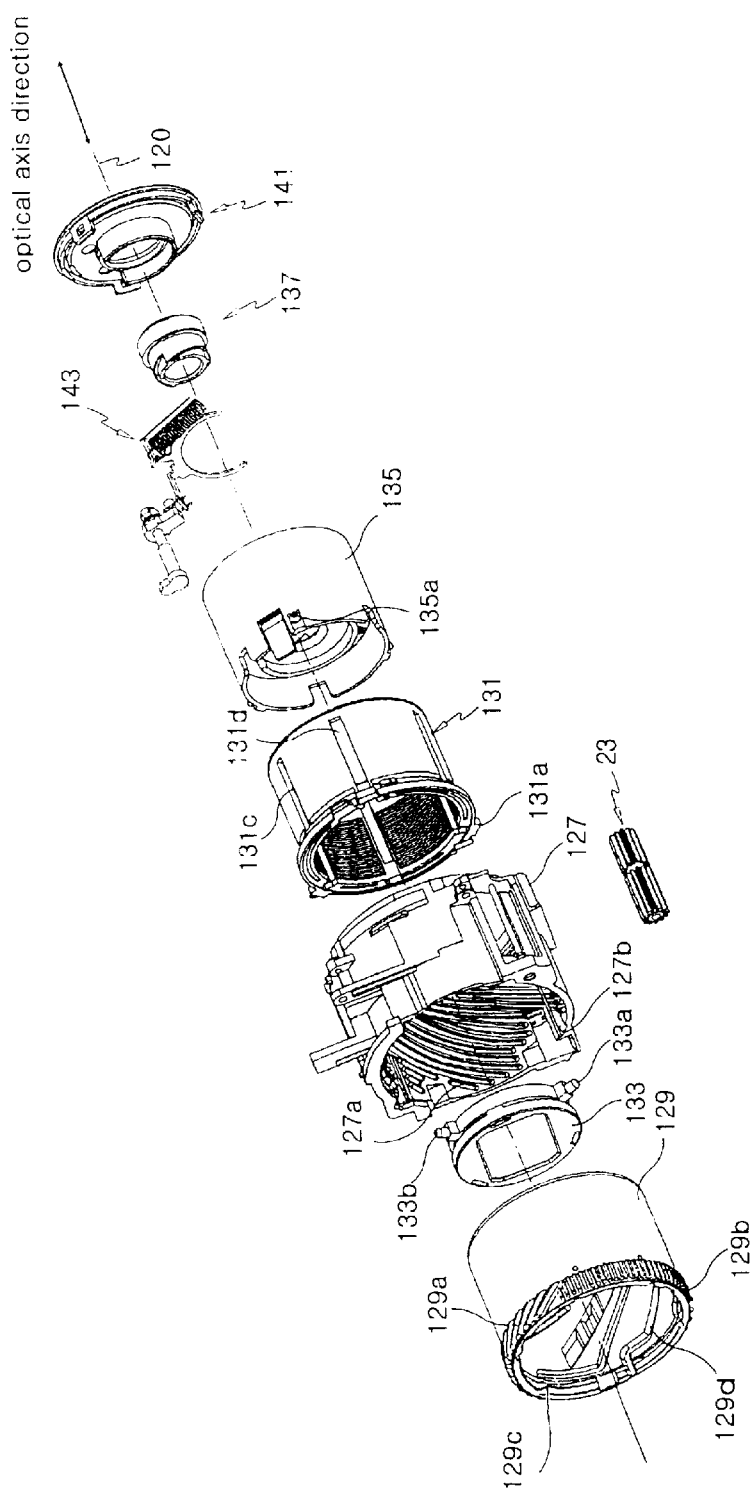
FIG. 19 is an exploded perspective view of a zoom lens barrel assembly with a focus control member according to a third preferred embodiment.
Figure 20:
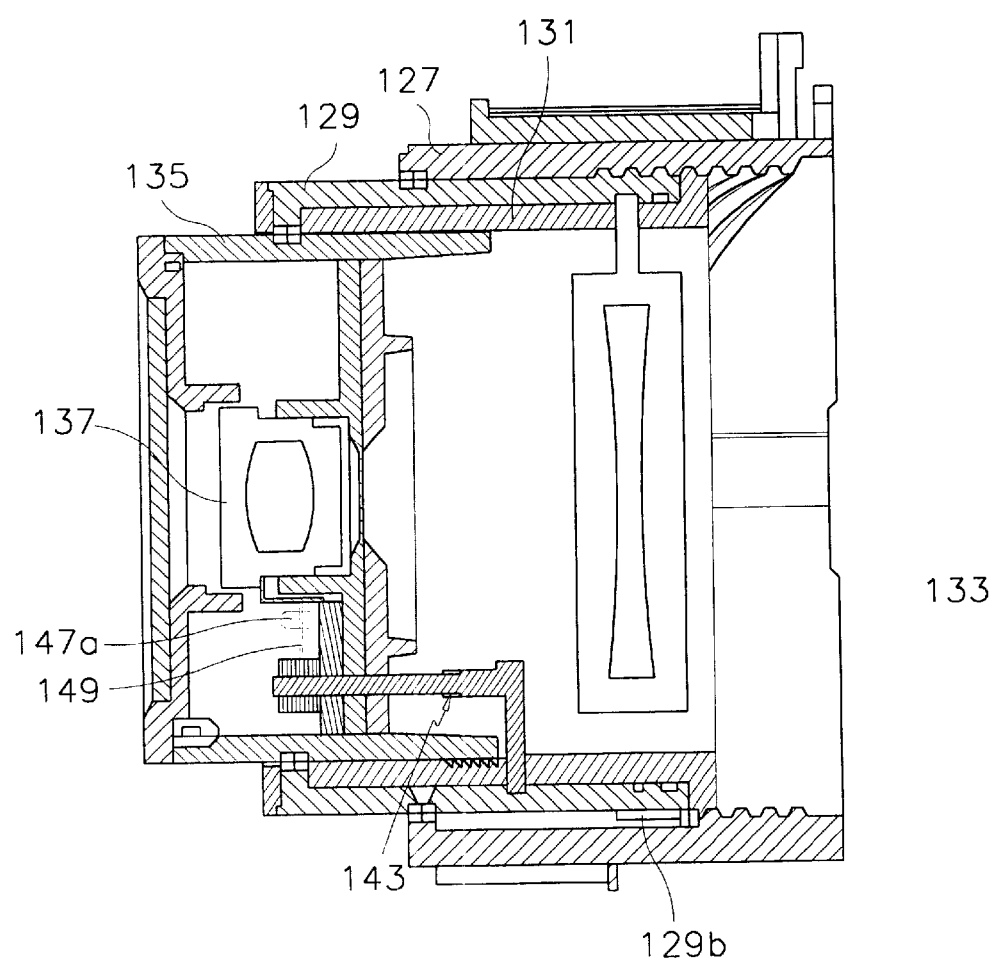
FIG. 20 is a combinatorial section view of the barrel assembly shown in FIG. 19.

FIG. 19 is an exploded perspective view of a zoom lens barrel assembly according to a third preferred embodiment of the present invention where the reference numeral 120 indicates an optical axis. FIG. 20 is a sectional view of the zoom lens barrel assembly shown in FIG. 19 cut in the optical axis direction.

As shown in the drawings, a lens base 127 fixed to the camera body 1 has an internal periphery with a plurality of female helicoid threads 127a and a plurality of linear guide grooves 127b arranged in the optical axis direction. The barrel idle gear 23 engaged with the fourth speed-reducing gear 21 is fixed to a side portion of the lens base 127.

A helicoid ring 129 is inserted into the lens base 127. The helicoid ring 129 has an external periphery with a plurality of male helicoid threads 129a at one end side and a plurality of spur gear threads 129b arranged between some of the neighboring male helicoid threads 129a. The male helicoid threads of the helicoid ring 129 engage the female helicoid threads 127a of the lens base 127. The spur gear threads 129b of the helicoid ring 129 engage the threads of the barrel idle gear 23 to receive the driving power of the zoom motor 3 via the speed-reducing gear group 5 and transmit it to the helicoid ring 129 to thereby rotate and linearly move the helicoid ring 129 in the optical axis direction.

Figure 24:
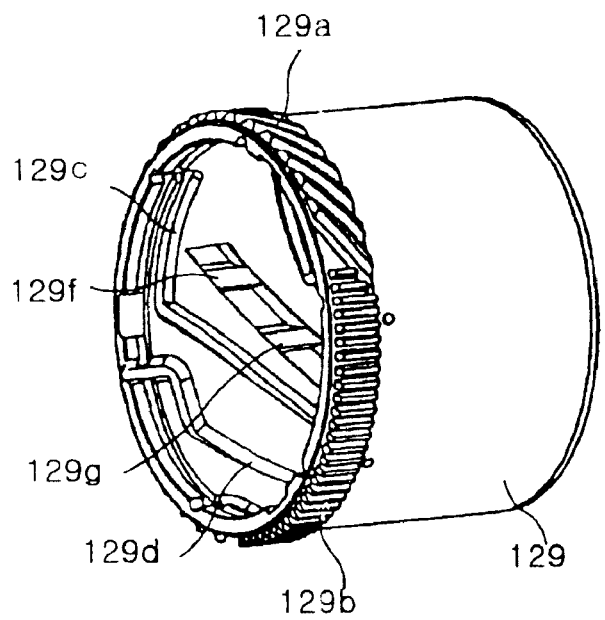
FIG. 24 is a perspective view of a helicoid ring according to the third preferred embodiment.
Figure 25:
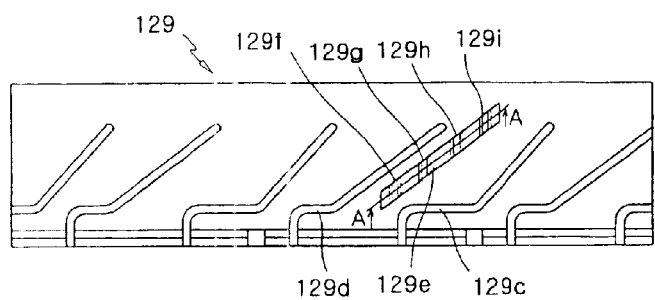
FIG. 25 is a plan view of the helicoid ring shown in FIG. 24 illustrating the internal periphery in a developed state.
Figure 26:
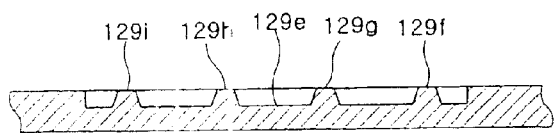
FIG. 26 is a sectional view of the helicoid ring cut along the A—A line shown in FIG. 25.

The helicoid ring 129 has an internal periphery with zoom ring guide grooves 129c and rear lens unit guide grooves 129d spirally arranged As shown in FIGS. 24 to 26, the internal periphery of the helicoid ring 129 is also provided with a focus control groove 129e and a plurality of focus control protrusions 129f, 129g, 129h and 129i arranged at the focus control groove 129e with a predetermined distance.

A guide barrel 131 is mounted within the helicoid ring 129 such that it linearly moves in the optical axis direction relative to the helicoid ring 129.

The guide barrel 131 has an external periphery with guide protrusions 131a. The guide protrusions 131a are interlocked with the linear guide grooves of the lens base 127 such that they can linearly move in the optical axis direction. The external periphery of the guide barrel 131 is also provided with rear lens unit guide grooves 131c and zoom ring guide grooves 131d which are all extended in the optical axis direction.

The rear lens unit frame 133 has an external periphery with guide protrusions 133a and 133b. The guide protrusions 133a and 133b are interlocked with the rear lens unit guide grooves 131c of the guide barrel 131 and the rear lens unit guide grooves 129d of the helicoid ring 129 such that they can linearly move in the optical axis direction.

A zoom ring 135 is received within the guide barrel 131 such that it can linearly move in the optical axis direction.

The zoom ring 135 has an external periphery with a plurality of guide protrusions 135a and an internal periphery with a plurality of female helicoid threads (not shown). The guide protrusions 135a are interlocked with the zoom ring guide grooves 131d of the guide barrel 131 and the zoom ring guide grooves 129c of the helicoid ring 129. In this structure, pursuant to the movement of the guide protrusions 135a, the zoom ring 135 can move in the optical axis direction.

A front lens unit frame 137 is mounted within the object side of the zoom ring 135. The front lens unit frame 137 has an external periphery with a plurality of male helicoid threads (not shown). The male helicoid threads of the front lens unit frame 137 engage the female helicoid threads of the zoom ring 135 such that the front lens unit frame 137 can rotate and linearly move in the optical axis direction to thereby control the focusing operation.

The installation structure of the front lens unit frame 137 may be changed on condition that the front lens unit frame 137 can rotate and linearly move in the optical axis direction to thereby control the focusing operation. For example, the front lens unit frame 137 may be fixed to a shutter block (not shown). Furthermore, the front lens unit frame 137 may be fixed to a shutter base 139 mounted within the zoom ring 135.

A lens protection barrier assembly 141 is mounted within the object side of the zoom ring 135.

A focus control member 143 is also mounted within the zoom ring 135 such that the front lens unit frame 137 can move at a predetermined position in synchronization with the rotation of the helicoid ring 129 to thereby control the focusing and zooming operation simultaneously.

Figure 21:
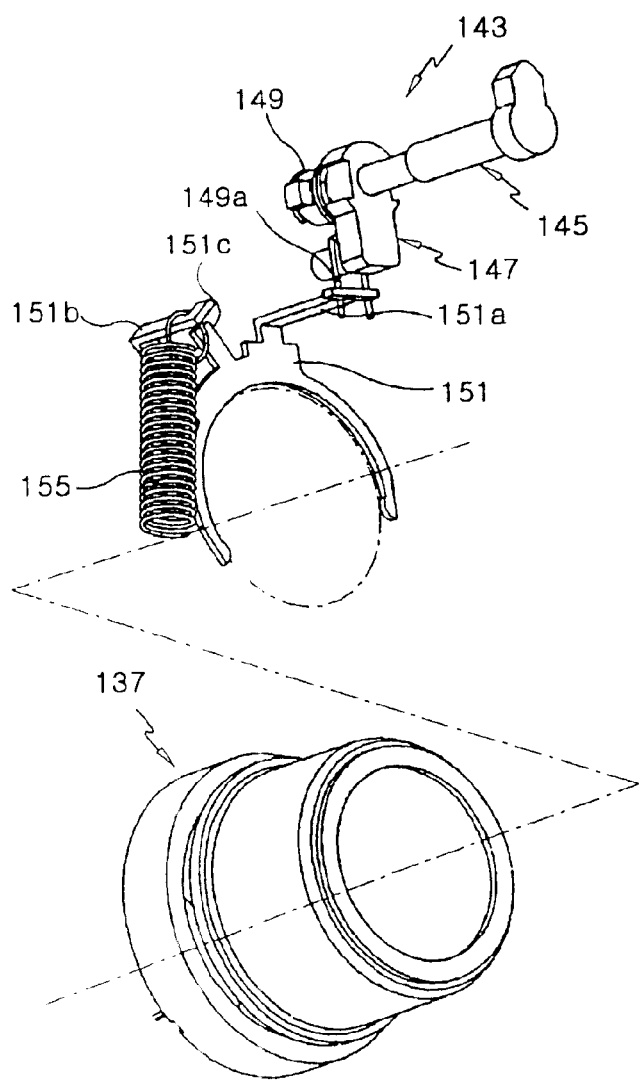
FIG. 21 is a perspective view of the focus control member shown in FIG. 19 specifically illustrating first and second focus cam levers of the focus control member.

As shown in FIG. 21, the focus control member 143 has a first focus cam lever 145 rotated together with the helicoid ring 129, a second focus cam lever 147 connected to the first focus cam lever 145 to be co-rotated, a torsion spring 149 for selectively transmitting the rotational power of the second focus cam lever 147 to the front lens unit frame 137 such that the front lens unit frame 137 can move between the near focal point and the infinite focal point. For this purpose, a power transmitting member 151 for relaying the rotational power transmitted from the torsion spring 149 to the front lens unit frame 137 is connected to the front lens unit frame 137. The power transmitting member 151 is provided with an elastic component at its one side such that the rotational power is always applied to the front lens unit frame 137 in a predetermined direction.

Figure 22:
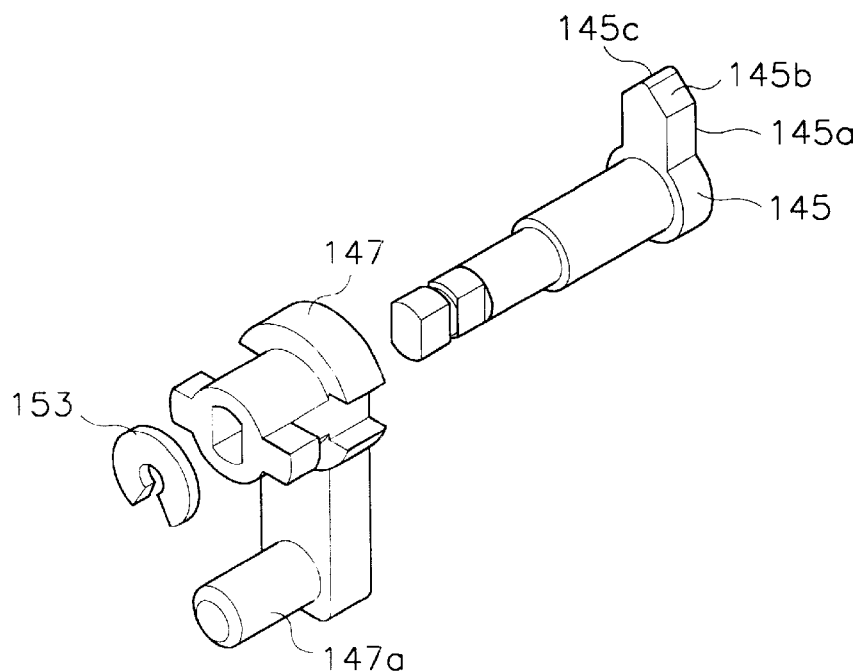
FIG. 22 is an exploded perspective view of the focus cam levers shown in FIG. 21.
Figure 23:
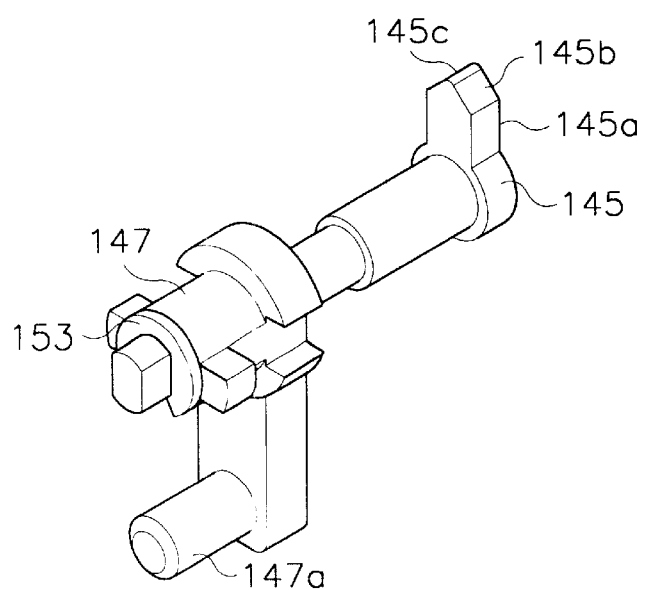
FIG. 23 is a combinatorial perspective view of the focus cam levers shown in FIG. 21.

FIG. 22 is an exploded perspective view illustrating the first and second focus cam levers 145 and 147, and FIG. 23 is a combinatorial view of the first and second focus cam levers 145 and 147 shown in FIG. 22.

The first focus cam lever 145 has a protrusion 145a at its one end. The protrusion 145a is interlocked with the focus control groove 129e of the helicoid ring 129 such that it can move while tightly contacting the focus control groove 129e.

The protrusion 145a is provided with inclined sides 145b and 145c at its top side and such that it can move along the focus control groove 129e and ride over the focus control protrusions 129f formed at the focus control groove 129e.

The first focus cam lever 145 is connected to the second focus cam lever 147 at its bottom side end with a snap ring 153 such that the first and second focus cam levers 145 and 147 can be rotated together.

Figure 29A:
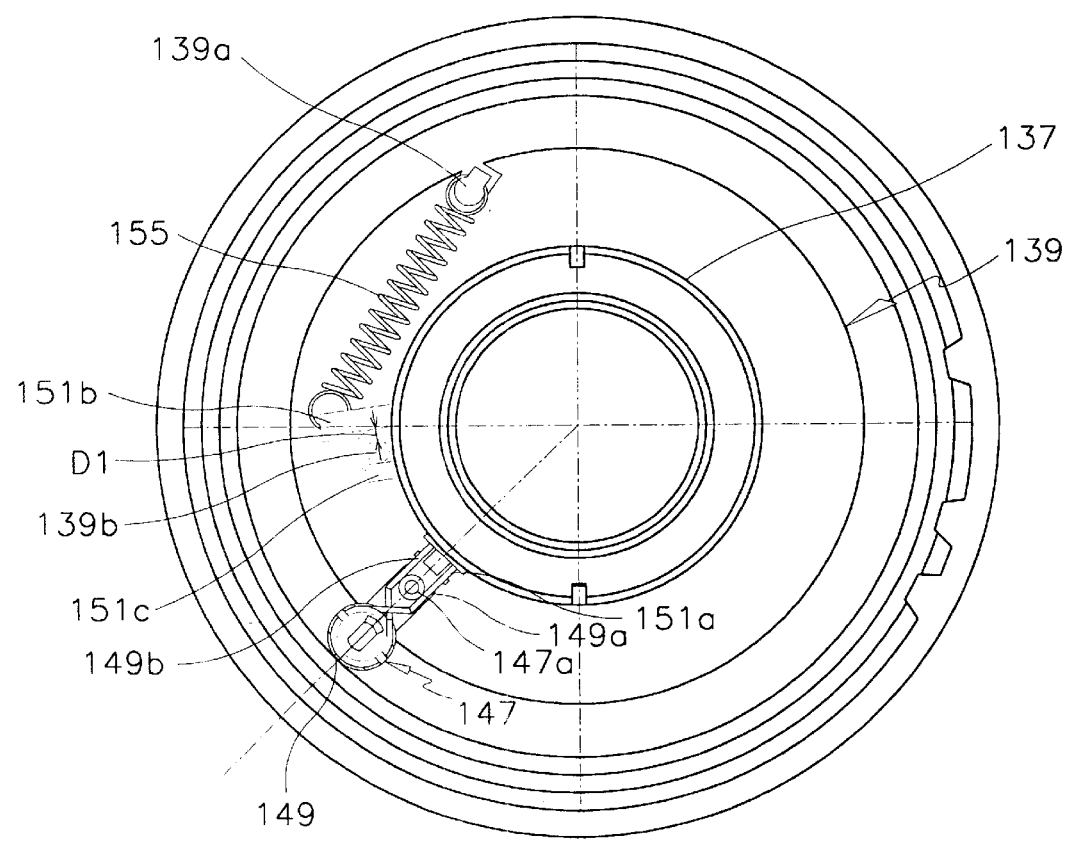
FIG. 29A is a view illustrating the positional relation of a front lens group to the second focus cam lever shown in FIG. 21.

The second focus cam lever 147 has a protrusion 147a at its free end. As shown in FIG. 29A, the torsion spring 149 is installed around the second focus cam lever 147 such that two free end portions 149a and 149b of the torsion spring 149 are stuck onto the protrusion 147a of the second focus cam lever 147.

As shown in FIG. 21, the power transmitting member 151 fixed around the front lens unit frame 137 has a first protrusion 151a extended in the optical axis direction, and second and third protrusions 151b and 151c extended from the optical axis to the peripheral side.

The first protrusion 151a is stuck between the free end portions 149a and 149b of the torsion spring 149. A tensional coil spring 155 is fixed to the second protrusion 151b at its one end. The opposite end of the tensional coil spring 155 is fixed to the shutter block 139. The second protrusion 151b is spaced apart from the third protrusion 151c with a predetermined distance.

In this structure, the tensional coil spring 155 always pulls the power transmitting member 151 such that the protrusion 145a of the first focus cam lever 145 tightly contacts the focus control groove 129e of the helicoid ring 129.

The zooming and focusing operation of the camera according to the second preferred embodiment will be specifically described below.

Figure 27:
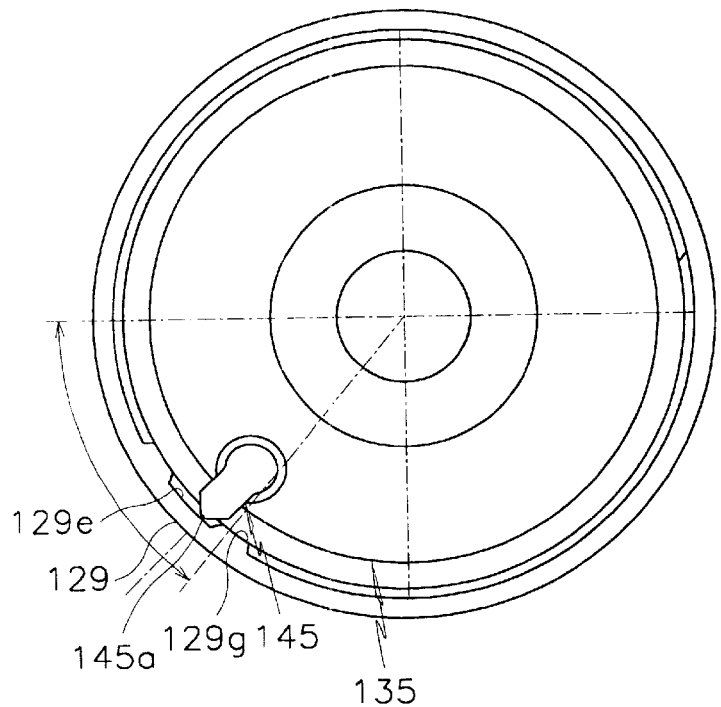
FIG. 27 is a view illustrating the operational interrelationship between the first focus cam lever shown in FIG. 21 and the helicoid ring shown in FIG. 24 in the zoom magnification preparing step.
Figure 28A:
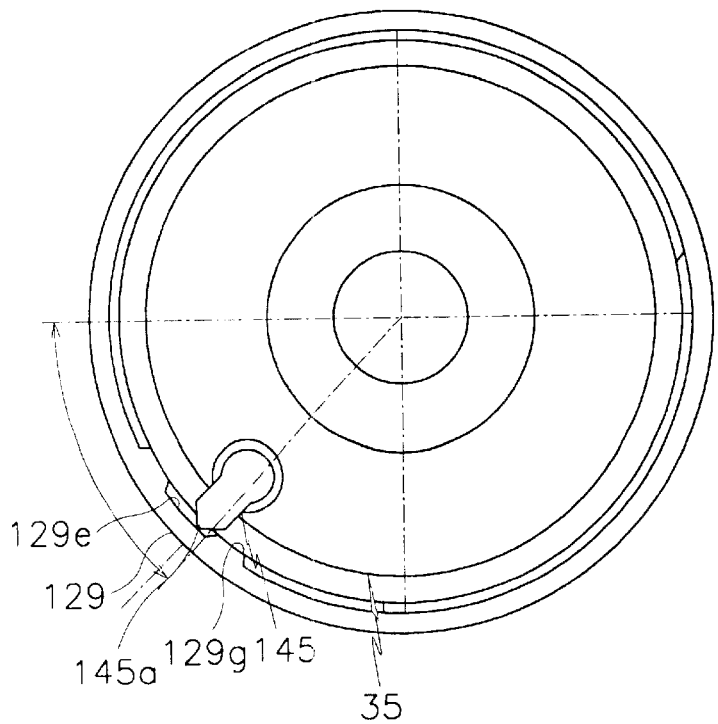
FIG. 28A is a view illustrating the rotation initiating state of the first focus cam lever shown in FIG. 21 in accordance with the rotation of the helicoid ring shown in FIG. 24.
Figure 28B:
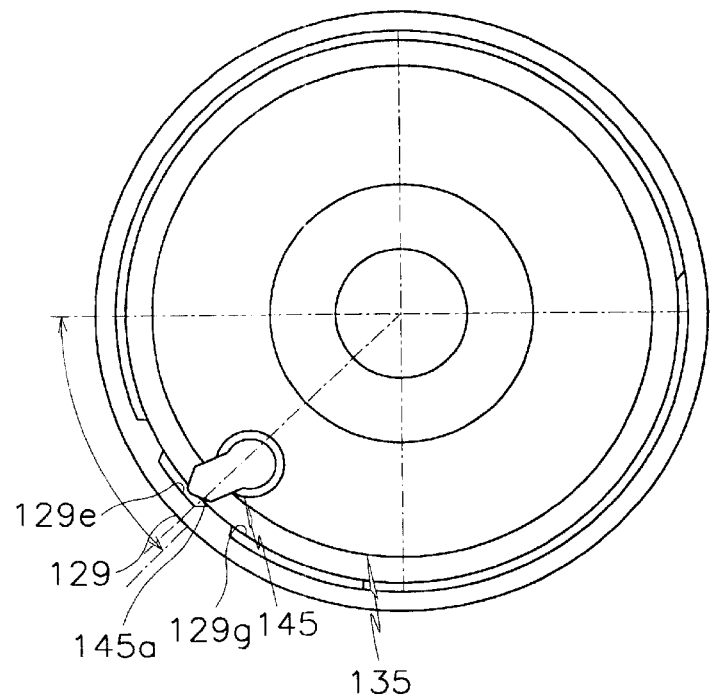
FIG. 28B is a view illustrating the rotating state of the first focus cam lever shown in FIG. 21 in accordance with the rotation of the helicoid ring shown in FIG. 24.
Figure 28C:
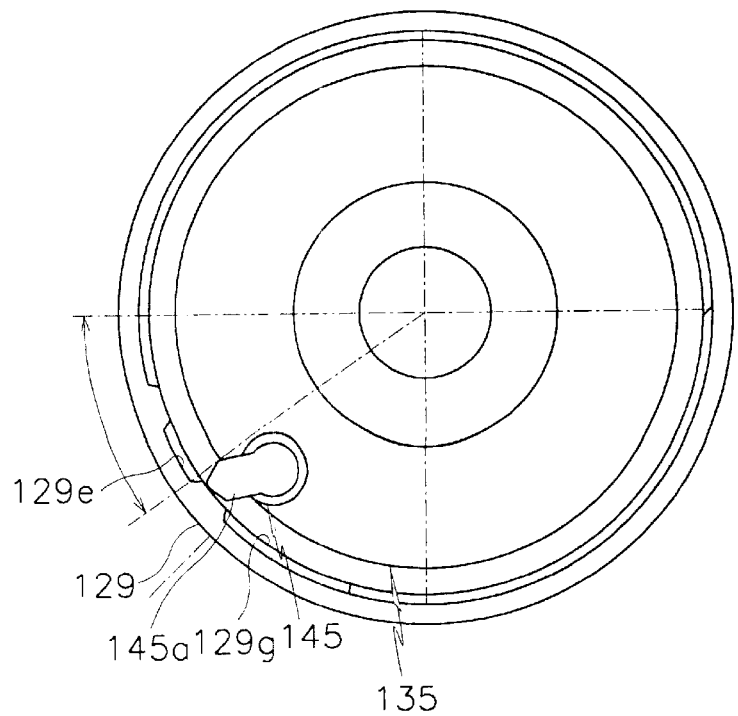
FIG. 28C is a view illustrating the rotated state of the first focus cam lever shown in FIG. 21 in accordance with the rotation of the helicoid ring shown in FIG. 24.

FIG. 27 is a view illustrating the operational relation of the first focus cam lever 145 to the helicoid ring 129 at the zoom magnification preparing step. FIG. 28A is a view illustrating the rotation initiating state of the first focus cam lever 145 in accordance with the rotation of the helicoid ring 129. FIG. 28B is a view illustrating the rotating state of the first focus cam lever 145 in accordance with the rotation of the helicoid ring 129. FIG. 28C is a view illustrating the rotated state of the fist focus cam lever 145 in accordance with the rotation of the helicoid ring 129.

At the camera-on state, the protrusion 145a of the fist focus cam lever 145 tightly contacts the focus control groove 129e of the helicoid ring 129. In this state, when the Tele or Wide switch 7 or 9 is operated, the zoom motor 3 is driven to rotate the barrel idle gear 23 via the power transmitting gear group 5. The barrel idle gear 23 engaged with the spur gear 129b of the helicoid ring 129 in turn rotates the helicoid ring 129. Then, since the male helicoid threads 129a of the helicoid ring 129 movably engage the female helicoid threads 127a of the lens base 127, the helicoid ring 129 rotates and linearly moves in the optical axis direction. Furthermore, since the guide protrusion 131a of the guide barrel 131 is movably interlocked with the linear guide groove 127b of the lens base 127, the guide barrel 131 also linearly moves in the optical axis direction together with the movement of the helicoid ring 129. As the helicoid ring 129 and the guide barrel 131 move in the optical axis direction, the zoom ring 135 mounted with the rear lens unit frame 133 and the front lens unit frame 137 moves in the optical axis direction.

The movement of the rear lens unit frame 133 in the optical axis direction is realized such that the guide protrusions 133a and 133b of the rear lens unit frame 133 are interlocked with the rear lens unit guide groove 131c of the guide barrel 131 and the rear lens unit guide groove 129d of the helicoid ring 129, and move along the rear lens unit guide grooves 131c and 129d.

Furthermore, the movement of the zoom ring 135 in the optical axis direction is realized such that the guide protrusions 135a of the zoom ring 135 are interlocked with the zoom ring guide grooves 131d of the guide barrel 131 and the zoom ring guide grooves 129c of the helicoid ring 129, and move along the zoom ring guide grooves 131d and 129c. In this way, as the zoom ring 135 moves, the front lens unit frame 137 mounted within the zoom ring 135 also moves in the optical axis direction to thereby realize the zooming operation.

When the zooming operation is realized, as shown in FIG. 28A, the protrusion 145a of the first focus cam lever 145 contacts the focus control groove 129e of the helicoid ring 129 and tightly contacts the focus control protrusion 129g. When the helicoid ring 129 further rotates, as shown in FIG. 28B, the protrusion 145a of the first focus cam lever 145 rotates toward the axial center of the first focus cam lever 145 owing to the focus control protrusion 129g. When the helicoid ring 129 still further rotates, as shown in FIG. 28C, the protrusion 145a of the first focus cam lever 145 moves along the upper surface of the focus control protrusion 129g so that the first focus cam lever 145 further moves toward the axial center. When the protrusion 145a of the first focus cam lever 145 is positioned at the focus control groove 129e of the helicoid ring 129, that position becomes the infinite focal position. In contrast, when the protrusion 145a contacts the upper surface of the focus control protrusion 129g, that position becomes the near focal position.

The focus controlling operation will be specifically described below.

FIG. 29A illustrates the positional relation of the second focus cam lever 147 to the front lens unit frame 137 in a state in which the protrusion 145a of the fist focus cam lever 145 tightly contacts the focus control groove 129e of the helicoid ring 129.

The torsion spring 149 is provided at the second focus cam lever 147 and the first protrusion 151a of the power transmitting member 151 is stuck between the first and second free end portions 149a and 149b of the torsion spring 149. The tensional coil spring 155 is provided at the shutter base 139 and interconnects the elastic member fixture protrusion 139a and the second protrusion 151b of the power transmitting member 151 such that the front lens unit frame 137 pauses at a predetermined position.

Figure 29B:
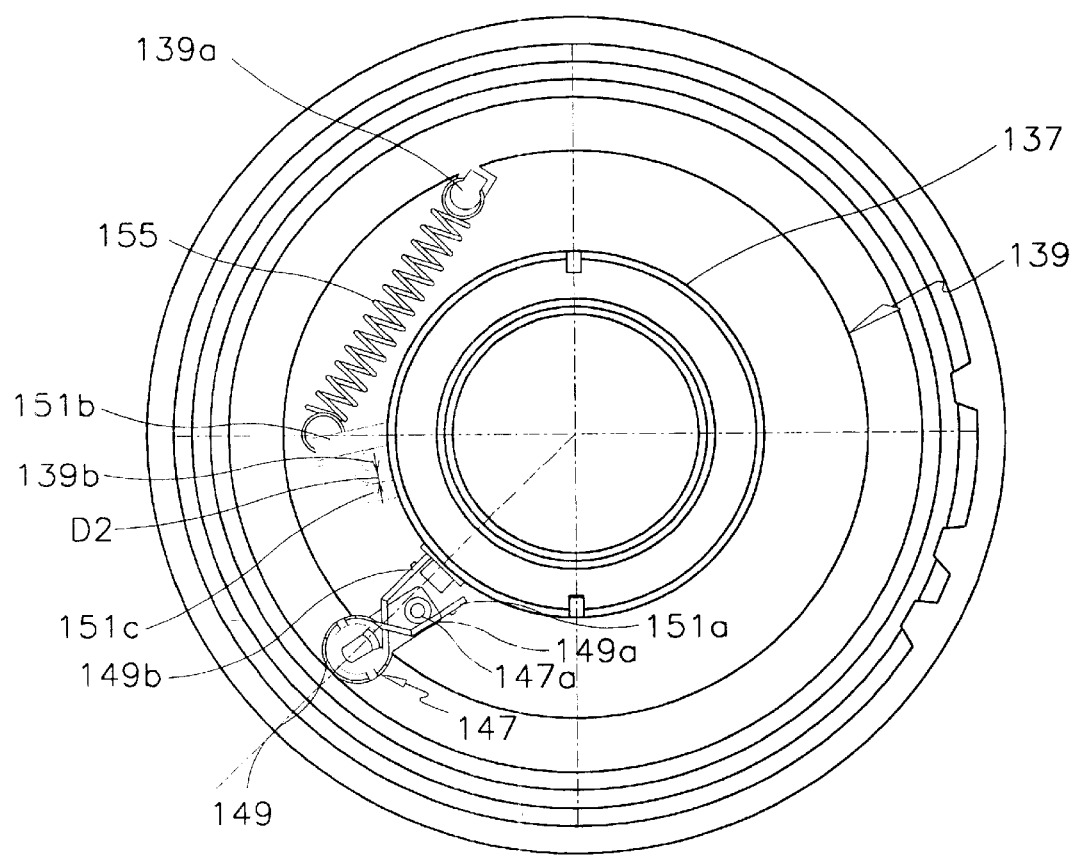
FIG. 29B is a view illustrating the rotational state of the front lens group shown in FIG. 29A in accordance with the rotation of the second focus cam lever shown in FIG. 21.

As described above, when the helicoid ring 129 rotates and linearly moves in the optical axis direction, the first focus cam lever 145 rotates to subsequently rotate the second focus cam lever 147. As shown in FIG. 29B, the protrusion 147a of the second focus cam lever 147 pressurizes the free end portion 149a of the torsion spring 149. As the free end portion 149a of the torsion spring 149 moves, the other free end portion 149b, owing to the elasticity of the torsion spring 149, rotates the first protrusion 151a of the power transmitting member 151 about the optical axis. In this way, the power transmitting member 151 rotates and, at the same time, the front lens unit frame 137 combined with the power transmitting member 151 rotates. At this time, the contact state between the third protrusion 151c of the power transmitting member 151 and a front lens unit stopping protrusion 139b releases, and the second protrusion 151b of the power transmitting member 151 tightly contacts the front lens unit stopping protrusion 139b to stop the front lens unit frame 137. In this way, the front lens unit frame 137 is in the state of being rotated from the shutter base 139 and moved in the optical axis direction, thereby indicating the near focal point. At this time, the protrusion 145a of the first focus cam lever 145 tightly contacts the focus control protrusion 129g, 129f, 129h or 129i of the helicoid ring 129.

Figure 29C:
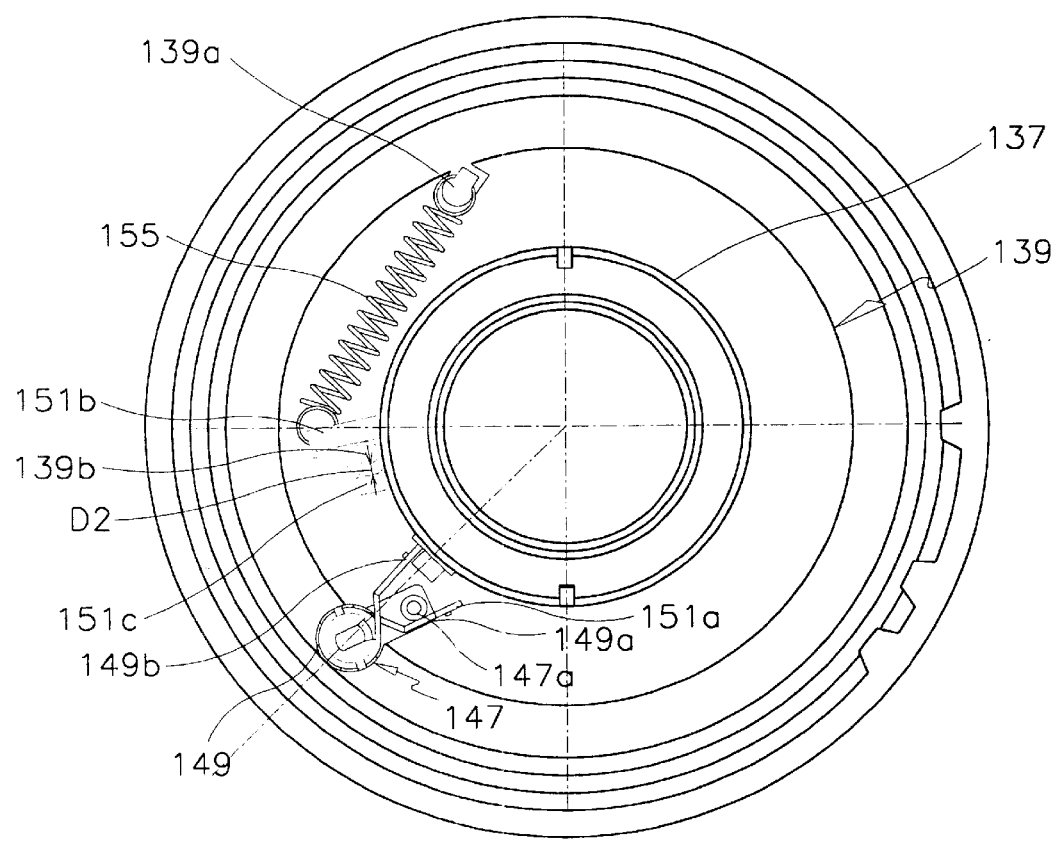
FIG. 29C is a view illustrating the positions of the second focus cam lever shown in FIG. 21 and the front lens group shown in FIG. 29A when the first focus cam lever shown in FIG. 21 maximally rotates.

FIG. 29C illustrates positional states of the torsion spring 149 and the front lens unit frame 137 in case the helicoid ring 129 is overrun.

In case the first focus cam lever 145 is overrun by the helicoid ring 129, the second focus cam lever 147 is also overrun so that the protrusion 147a of the second focus cam lever 147 further pressurizes and moves the free end portion 149a of the torsion spring 149. However, in this preferred embodiment, since the distance D1 or D2 between the front lens unit stopping protrusion 139b of the shutter base 139 and the second or third protrusion 151b or 151c is established to be adapted to the initial value, the focus missing error due to the over-run can be prevented.

Figure 30:
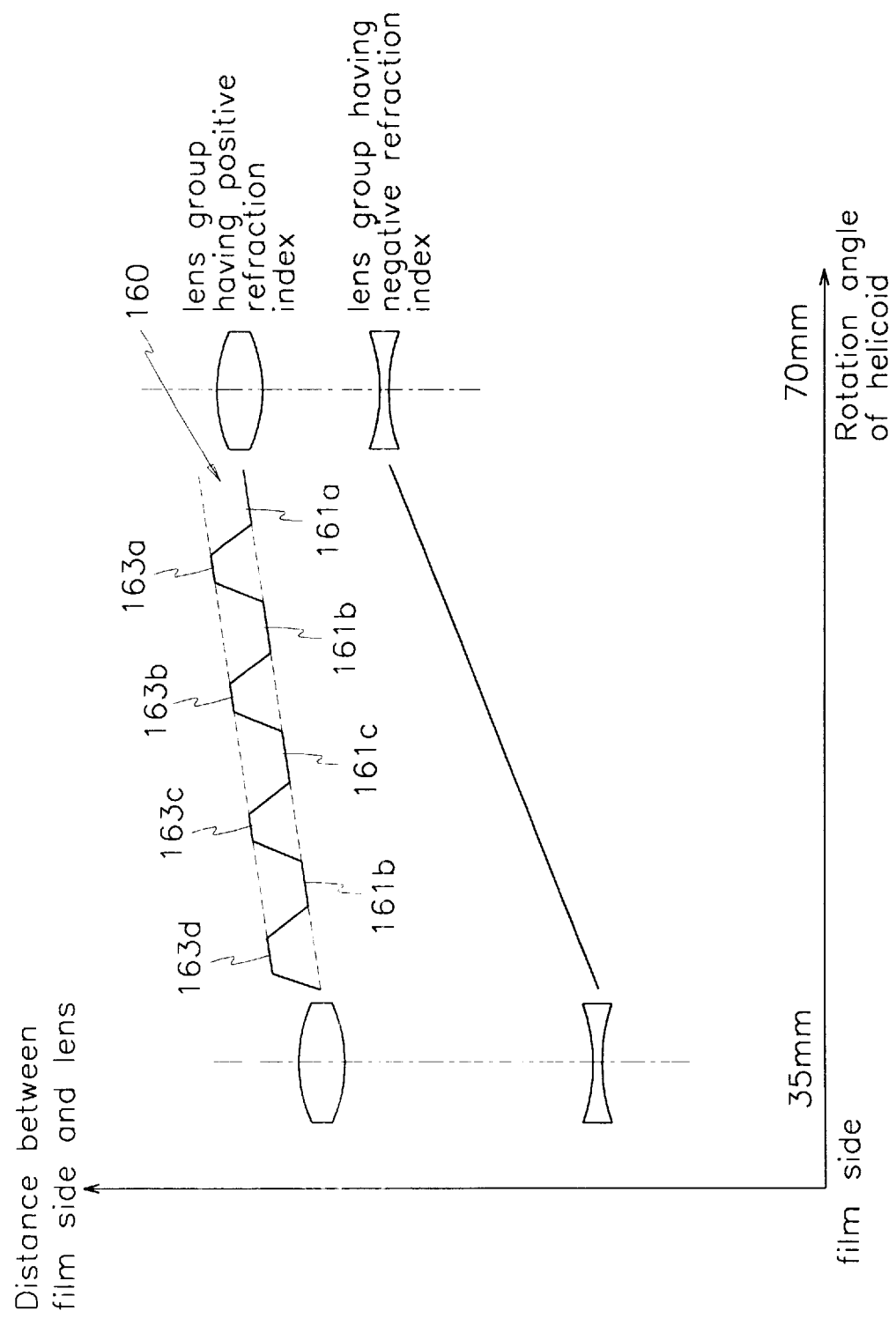
FIG. 30 is a graph illustrating the moving routes of the front lens group shown in FIG. 29A.

FIG. 30 is a graph illustrating the focal length variation of the front and rear lens units in accordance with the rotation angles of the helicoid ring 129.

As the zooming operation is realized, the focal lengths of the front and rear lens units vary in accordance with the rotation angles of the helicoid ring 129. Particularly, the focal length of the front lens unit varies during the zooming operation. That is, as shown in FIG. 30, when the protrusion 145a of the first focus cam lever 145 contacts the focus control groove 129e, the focusing is adapted to distant focusing positions 161a, 161b, 161c and 161d of a front lens unit movement line 160. In contrast, when the protrusion 145a of the first focus cam lever 145 contacts the focus control protrusions 129f, 129g, 129h and 129i, the focusing is adapted to near focusing positions 163a, 163b, 163c and 163d.

Figure 31:
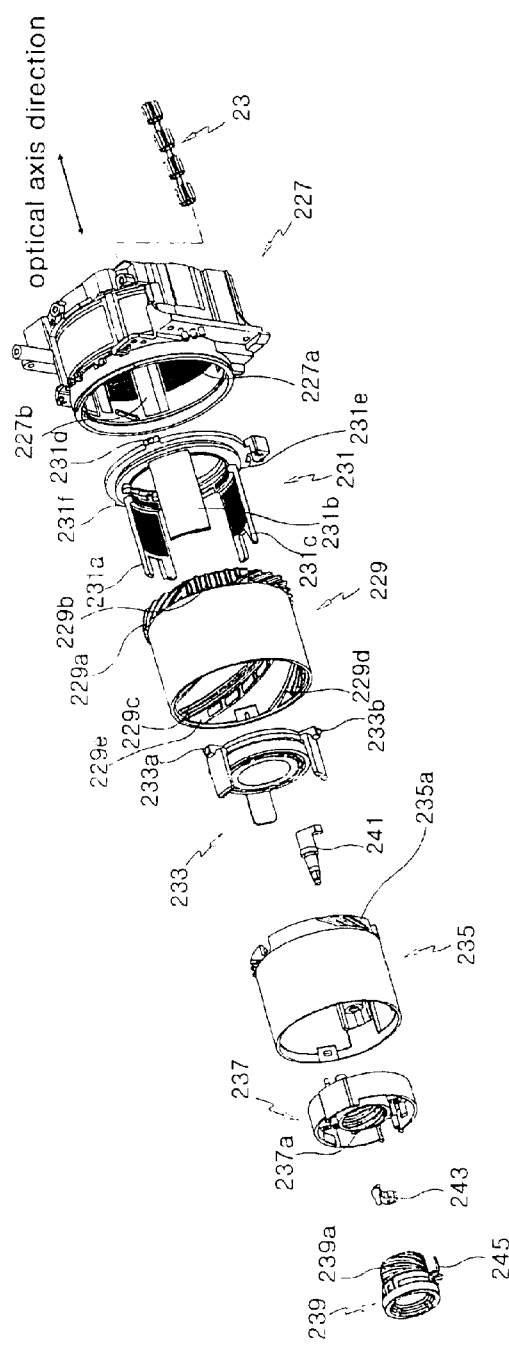
FIG. 31 is an exploded perspective view of a zoom lens barrel assembly with a helicoid ring and first to third focus control levers according to a fourth preferred embodiment of the present invention.

FIG. 31 is an exploded perspective view of a zoom lens barrel assembly according to a fourth preferred embodiment of the present invention where the reference number 220 indicates an optical axis. A lens base 227 fixed to the camera body 1 has an internal periphery with a plurality of female helicoid threads 227a and a plurality of linear guide grooves 227b arranged in the optical axis direction. The barrel idle gear 23 engaged with the fourth speed-reducing gear 21 is fixed to the lens base 227.

A helicoid ring 229 is inserted into the lens base 227. The helicoid ring 229 has an external periphery with a plurality of male helicoid threads 229a at one side and a plurality of spur gear threads 229b arranged between some of the neighboring male helicoid threads 229a. The male helicoid threads of the helicoid ring 229 engage the female helicoid threads 227a of the lens base 227. The spur gear threads 229b of the helicoid ring 229 engage the threads of the barrel idle gear 23 to receive the driving power of the zoom motor 3 via the speed-reducing gear group 5, and transmit it to the helicoid ring 229 to thereby rotate and linearly move the helicoid ring 229 in the optical axis direction.

The helicoid ring 229 has an internal periphery with zoom ring guide grooves 229c and rear lens unit guide grooves 229d spirally arranged.

The internal periphery of the helicoid ring 229 is also provided with a focus control groove 229e.

A guide plate 231 is mounted within the film side of the helicoid ring 229 such that it linearly moves in the optical axis direction relative to the helicoid ring 229. The guide plate 231 has three linear movement guide members 231a, 231b and 231c which protrude from its lateral side in the optical axis direction with a predetermined distance. The guide plate 231 has an external periphery with a plurality of protrusions 231d, 231e and 231f. The protrusions 231d, 231e and 231f of the guide plate 231 are interlocked with zoom ring guide grooves (not shown) to linearly move a zoom ring 235 in the optical axis direction. Furthermore, the protrusions 231d, 231e and 231f of the guide plate 231 are interlocked with the linear guide grooves 227b of the lens base 227 such that they can linearly move in the optical axis direction.

A rear lens frame 233 has an external periphery with guide protrusions 233a and 233b. The guide protrusions 233a and 233b of the rear lens frame 233 are interlocked with the rear lens guide grooves 229d of the helicoid ring 229 such that the rear lens guide frame 233 can linearly move in the optical axis direction.

The zoom ring 235 has an external periphery with a plurality of male helicoid threads 235a and an internal periphery with a plurality of guide portions 235b. The male helicoid threads 235a of the zoom ring 235 engage the zoom ring guide grooves 229c of the helicoid ring 229 such that the zoom ring 235 can linearly move in the optical axis direction by way of the linear movement guide plate 231. The linear movement guide members 231a, 231b and 231c of the linear movement guide plate 231 are stuck in the guide portions 235b such that the movement of the zoom ring 235 can be made along the linear movement guide members 231a, 231b and 231c.

A shutter block 237 is mounted within the object side of the zoom ring 233. The shutter block 237 has an internal periphery with a plurality of female helicoid threads 237a.

A front lens frame 239 is mounted within the shutter block 237. The front lens frame 239 has an external periphery with a plurality of male helicoid threads 239a. The male helicoid threads 239a of the front lens frame 239 engage the female helicoid threads 237a of the shutter block 237 such that the front lens frame 239 can rotate and linearly move in the optical axis direction to thereby perform the focus controlling operation.

In order to achieve one directional focus controlling operation, a first focus control lever 241 is movably provided at the film side of the zoom ring 235 and a second focus control lever 243 is movably provided at the object side of the zoom ring 235. A third focus control lever 245 is provided at the external periphery of the front lens frame 239 and moves in synchronization with the first and second focus control levers 241 and 243 such that the front lens frame 239 can rotate and linearly move in the optical axis direction to thereby perform the focus controlling operation.

The details of the helicoid ring 229 will be described below.

Figure 32:
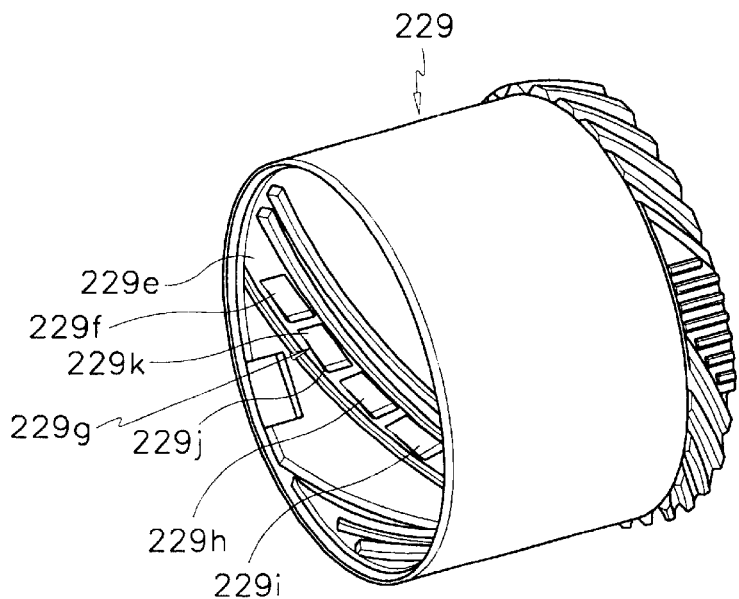
FIG. 32 is an enlarged perspective view of the helicoid ring shown in FIG. 31.
Figure 33:
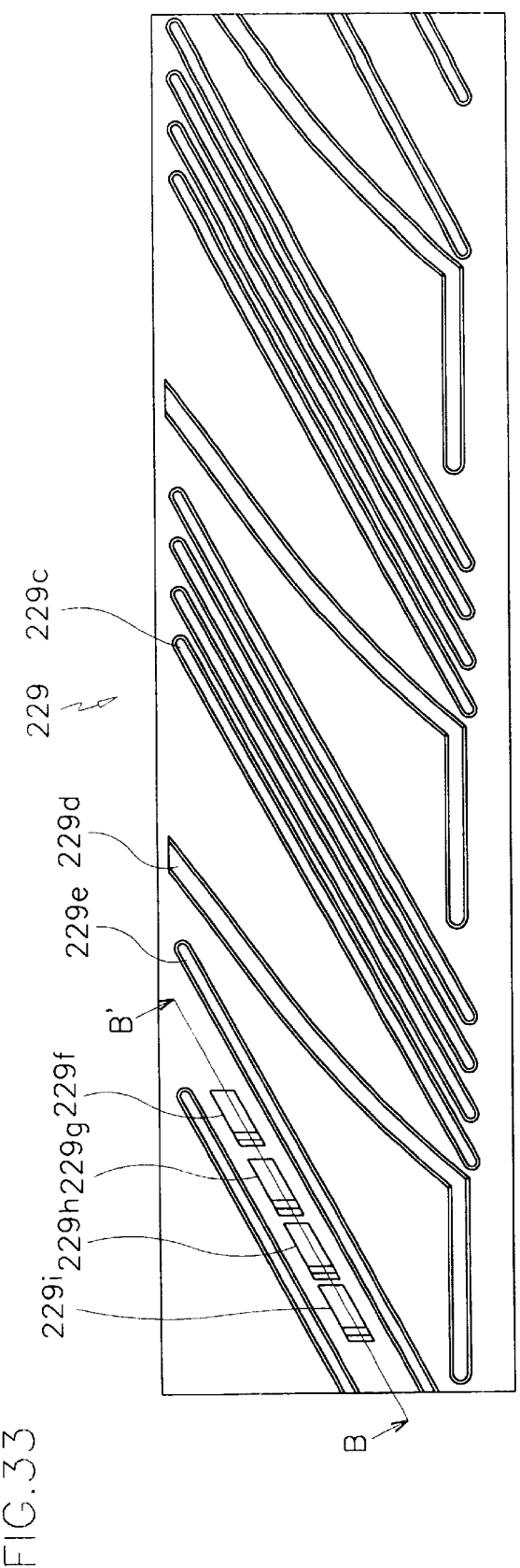
FIG. 33 is a view of the helicoid ring shown in FIG. 31 illustrating its internal periphery in a developed state.
Figure 34:
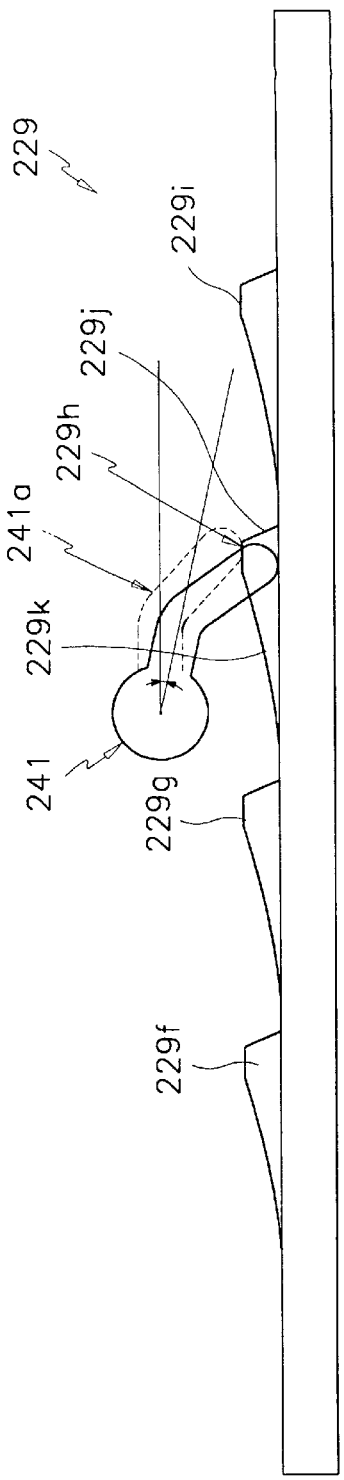
FIG. 34 is a sectional view of the helicoid ring cut along the B—B line shown in FIG. 33.

FIG. 32 is an amplified perspective view of the helicoid ring 229. FIG. 33 is a developmental view illustrating the developed state of the internal periphery of the helicoid ring 229. FIG. 34 is a sectional view of the helicoid ring 229 cut along the B—B line shown in FIG. 33.

As described above, the focus control groove 229e is spirally formed at the internal periphery of the helicoid ring 229. A plurality of focus control protrusions 229f, 229g, 229h and 229i are formed at the focus control groove 229e with a predetermined distance. The focus control protrusions 229f, 229g, 229h and 229i each have a relatively large inclined side 229j and a relatively small inclined side 229k. The relatively large inclined side 229j is oriented in order that when the helicoid ring 229 linearly moves and rotates toward the object side, it comes to be in a near focus controlling state.

The details of the first to third focus control levers 241, 243 and 245 will be described below.

Figure 35:
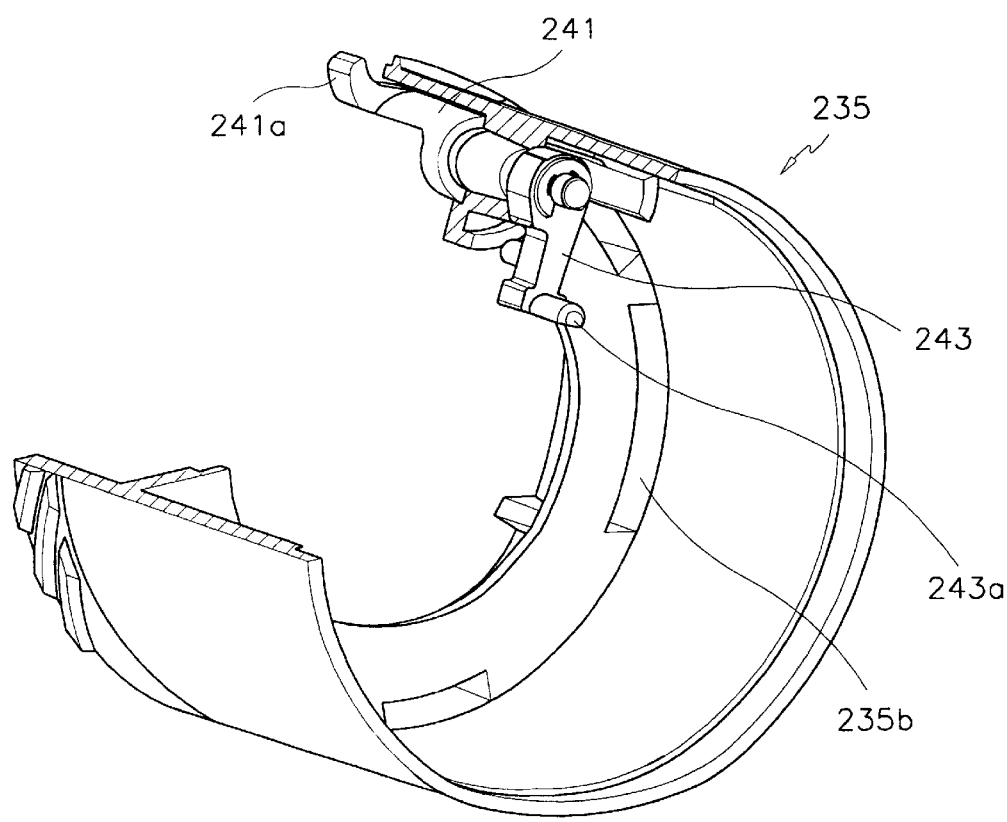
FIG. 35 is a combinatorial perspective view of the first and second focus control levers shown in FIG. 31.

FIG. 35 is a view illustrating the combinatorial state of the first and second focus control levers 241 and 243.

The first focus control lever 241 tightly contacts the focus control groove 229e at one side and is fixed to the second focus control lever 243 at the other side. The second focus control lever 243 is structured that it can rotate in synchronization with the rotation of the first focus control lever 241.

Figure 36:
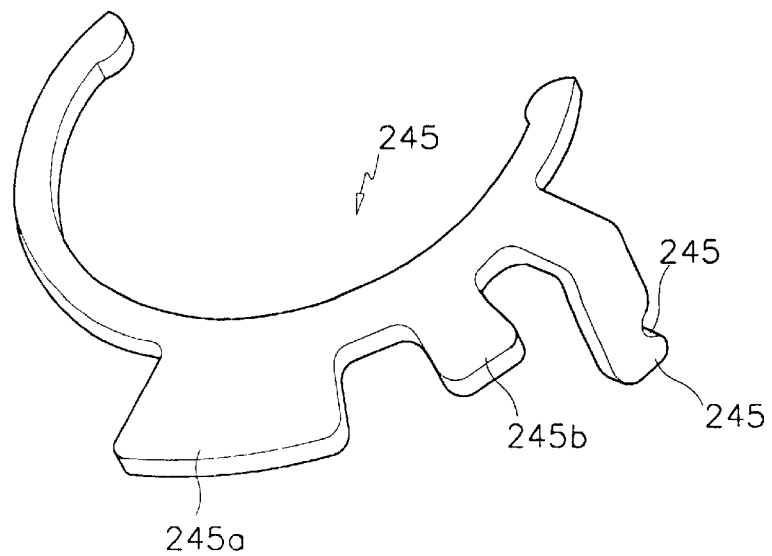
FIG. 36 is a perspective view of the third focus control lever shown in FIG. 31.

FIG. 36 specifically illustrate the third focus control lever 245. The third focus control lever 245 is fixed around the front lens frame 239 via bonding.

The third focus control lever 245 has a first protrusion 245a protruded in the radial direction with respect to the optical axis, a second protrusion 245b spaced apart from the first protrusion 245a, and a third protrusion 245c spaced apart from the second protrusion 245b in the optical axis direction. The third protrusion 245c is provided with a spring hanging portion 245d at its one side.

Figure 37:
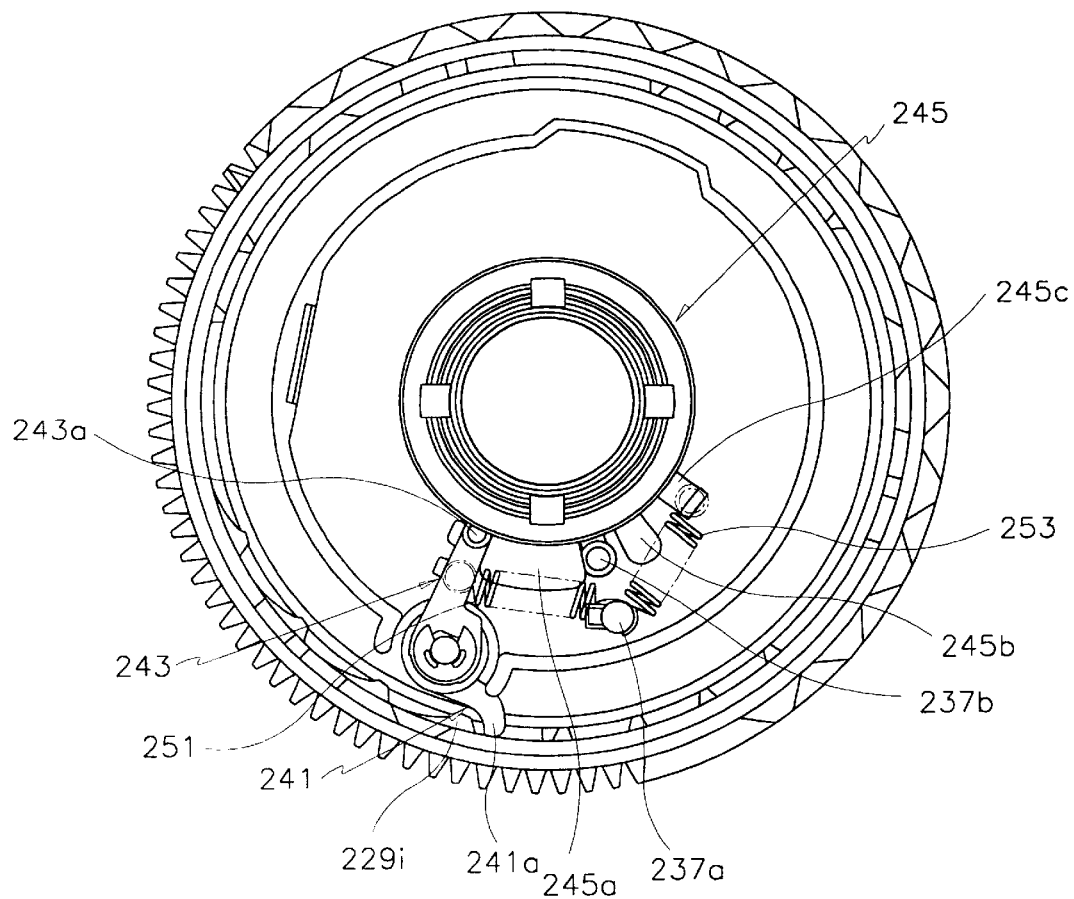
FIG. 37 is a combinatorial front view of the zoom lens barrel assembly shown in FIG. 31.

FIG. 37 illustrates the combinatorial relations among the focus control groove 229e of the helicoid ring 229, and the first to third focus control levers 241, 243 and 245.

A focus control contact portions 241a is formed at a side of the first focus control lever 241 in a radial direction with respect to the optical axis. The focus control contact portion 241a tightly contacts the focus control groove 229e of the helicoid ring 229. A protrusion 243a is formed at the second focus control lever 243. The protrusion 243a of the second focus control lever 243 tightly contacts the left side of the first protrusion 245a of the third focus control lever 245 on the basis of the drawing. The contact between the protrusion 243a of the second focus control lever 243 and the first protrusion 245a of the third focus control lever 245 is secured because the spring hanging protrusion 237a protruded from the object side of the shutter block 237 in the optical axis direction and the second focus control lever 243 pull toward each other via a first elastic member 251 formed with a tensional coil spring. Furthermore, another spring hanging portion 245d is formed at the third protrusion 245c of the third focus control lever 245 and the spring hanging protrusion 237a of the shutter block 237 and a spring hanging protrusion 245d of the third focus control lever 245 pull toward each other via a second elastic member 253 formed with a tensional coil spring.

It is preferable that the first elastic member 251 has greater elasticity than that of the second elastic member 253.

A fixture protrusion 237b is formed at the object side of the shutter block 237 between the first and second protrusions 245a and 245b of the third focus control lever 245.

Figure 38:
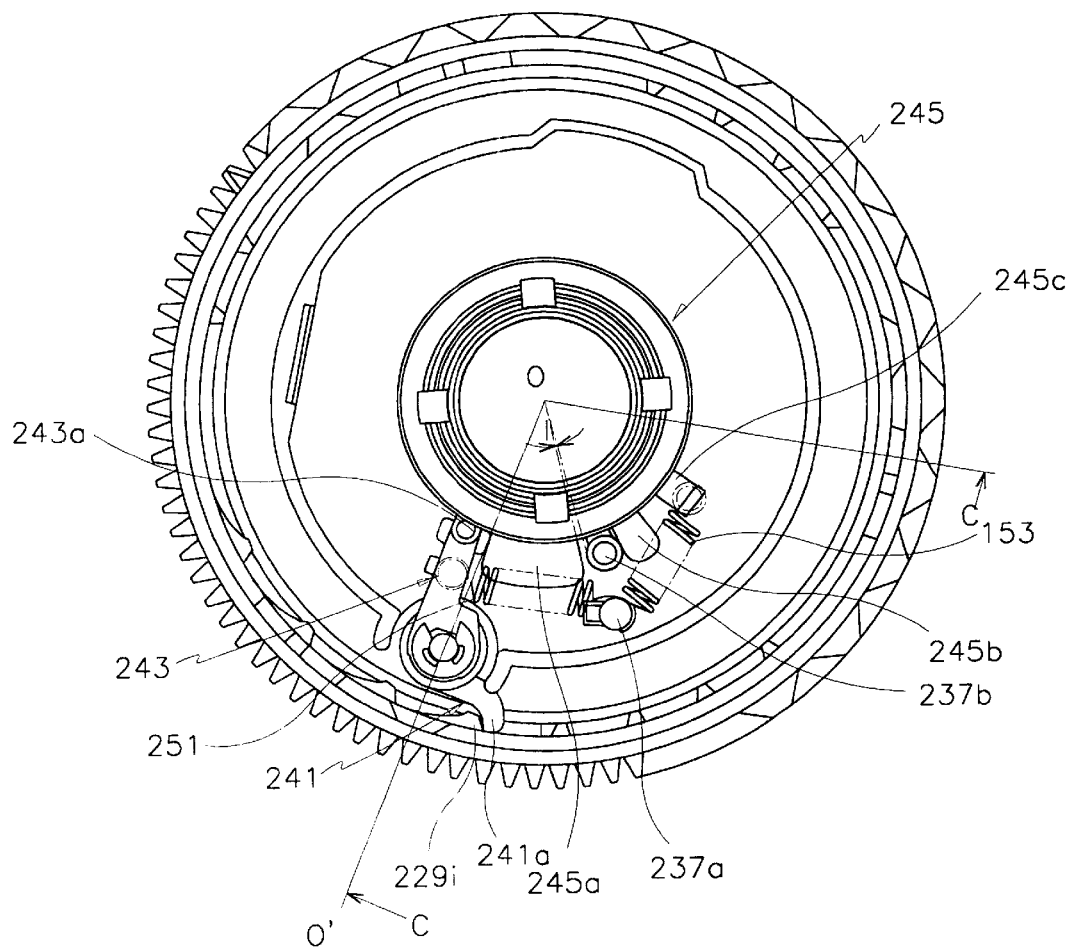
FIG. 38 is a view illustrating an operational state of the zoom lens barrel assembly shown in FIG. 31.

The zooming and focusing operational procedure will be described below with reference to FIG. 38.

When Tele and Wide switch 7 or 9 is operated at the camera-on state, the zoom motor 3 is driven to rotate the barrel idle gear 23 via the power transmitting gear group 5. The barrel idle gear 23 engaged with the spur gear 229b of the helicoid ring 229 rotates the helicoid ring 229. Then, the helicoid ring 229 rotates and linearly moves in the optical axis direction along the female helicoid threads of the lens base 227. Pursuant to the movement of the helicoid ring 229, the guide plate 231 also linearly moves in the optical axis direction. At this time, the rear lens frame 233 and the zoom ring 235 also move in the optical axis direction.

In accordance with the movement of the zoom ring 235, the front lens frame 239 also moves in the optical axis direction, thereby realizing the zooming operation.

At this time, the first focus control lever 241 moves along the relatively large inclined side 229j of the focus control protrusion 229i or other focus control protrusions while the focus control contact portion 241a of the first focus control lever 241 tightly contacts the focus control groove 229e of the helicoid ring 229. Then, the first focus control lever 241 rotates in an anti-clockwise direction on the basis of the drawing while overcoming the elastic power of the first elastic member 251, and the third focus control lever 245 rotates in a clockwise direction on the basis of the drawing by way of the second elastic member 253. At this time, the second protrusion 245b of the focus control lever 245 is stopped by the stopper protrusion 237b. Accordingly, the front lens frame 239 moves along the helicoid threads 237a of the shutter block 237 to thereby realize the focus controlling operation.

When magnification is further elevated, the focus control contact portion 241a rides over the focus control protrusion 229i and moves on the relatively small inclined side 229k to thereby prepare the subsequent focus controlling operation. Since the first elastic member 251 has a higher elasticity than the second elastic member 253, the focus control contact portion 241a returns to its initial position shown in FIG. 37.

At this time, since the first focus control lever 241 has a rotation angle corresponding to the relatively large inclined side 229j of the focus control protrusion 229i, the rotation angles of the first and second focus control levers 241 and 243 can be reduced. It is possible that the movement of the first focus control lever 241 is made in reverse order to realize the focus controlling operation.

As described above, in the camera with the above-described zoom lens barrel driving system, the barrel components relevant for the zooming operation and the lens components relevant for the focusing operation are driven by one driving source in a simplified but effective manner so that the stability of the overall camera system can be ensured with lower production cost. Furthermore, since the zooming and focusing operations are continuously or simultaneously performed, good quality of photographs can be obtained over the overall photographing optical field.

While the present invention has been described in detail with reference to the preferred embodiments, those skilled in the art will appreciate that various modifications and substitutions can be made thereto without departing from the spirit and scope of the present invention as set forth in the appended claims.

That which is claimed is:

1. A camera having a zoom lens barrel driving system, the zoom lens barrel driving system comprising:

a driving source;

a magnification controlling unit comprising a plurality of barrels and a plurality of lens groups, the barrels and the lens groups capable of moving in an optical axis direction upon receipt of driving power from the driving source such that magnification continuously varies; and a focus controlling unit also comprising with the lens groups, the lens groups capable of repeatedly moving between a near focal position and an infinite focal position in the optical axis direction in synchronization with variations in the magnification to perform a focus controlling operation.

2. The camera having the zoom lens barrel driving system of claim 1 wherein the lens group of the focus controlling unit comprises a front lens group, the front lens group capable of moving in the optical axis direction to perform the focus controlling operation.

3. A camera having a camera body and a zoom lens barrel driving system, the zoom lens barrel driving system comprising:

a motor;

a plurality of power transmitting gears connected to the motor;

a lens base fixed to the camera body;

a barrel idle gear fixed to the lens base to receive driving power from the motor via the power transmitting gears;

a guide plate mounted within the lens base, the guide plate capable of linearly moving in a optical axis direction, the guide plate having a plurality of linear movement guide members extended in the optical axis direction with each linear movement guide members having a predetermined length, each of the linear movement guide members also having a plurality of focus cam surfaces;

a helicoid ring mounted within the lens base, the helicoid ring being combined with the guide plate such that the helicoid ring is capable of moving relative to the guide plate, the helicoid ring also capable of rotating and linearly moving in the optical axis direction upon receipt of the driving power transmitted through the barrel idle gear;

a zoom ring mounted within the helicoid ring, the zoom ring capable of rotating relative to the helicoid ring by the guidance of the guide plate and linearly moving in the optical axis direction;

a rear cam combined with the zoom ring, the rear cam capable of rotating and linearly moving in the optical axis direction in accordance with the movement of the helicoid ring;

a rear lens group mounted within the zoom ring, the rear lens group capable of moving in the optical axis direction in synchronization with the rear cam;

a shutter block fixed to the zoom ring to control quantity of light;

a magnification control unit having a front lens group, the front lens group being mounted within the shutter block and capable of rotating and linearly moving in the optical axis direction;

a cam lever fixed to an eccentric position of the shutter block, the cam lever capable of repeatedly rotating in a predetermined area in synchronization with the focus cam side; and a focus control unit having a focus relay lever, the focus relay lever being fixed to the front lens group and capable of repeatedly moving the front lens group in the optical axis direction by a predetermined distance in accordance with the rotation of the cam lever.

4. The camera having the zoom lens barrel driving system of claim 3 wherein the front lens group is connected to the shutter block via an elastic member such that one end of the focus cam lever tightly contacts the focus cam surface.

5. The camera having the zoom lens barrel driving system of claim 3 wherein the cam lever comprises a first rotating arm contacting the focus cam surface and a second rotating arm contacting the focus relay lever, the first rotating arm being smaller than the second rotating arm.

6. The camera having a camera body and a zoom lens barrel driving system, the zoom lens barrel driving system comprising:

a motor mounted within the camera body;

a plurality of power transmitting gears connected to the motor;

a lens base fixed to the camera body, the lens base having an internal periphery with a plurality of female helicoid threads and a plurality of linear guide grooves in an optical axis direction;

a barrel idle gear fixed to the lens base, the barrel idle gear being engaged with the neighboring power transmitting gear to receive driving power from the motor via the power transmitting gears;

a helicoid ring having an external periphery with a plurality of male helicoid threads and a plurality of spur gear threads, and an internal periphery with a plurality of female helicoid threads, the male helicoid threads of the helicoid ring being engaged with the female helicoid threads of the lens base such that the helicoid ring is capable of rotating and linearly moving in the optical axis direction, the spur gear threads being engaged with threads of the barrel idle gear such that the helicoid ring is capable of rotating and linearly moving in the optical axis direction upon receipt of driving power through the barrel idle gear;

a guide plate combined with the helicoid ring, the guide plate capable of rotating relative to the helicoid ring and linearly moving along the linear guide groove of the lens base in the optical axis direction, the guide plate having a front end with a plurality of linear movement guide members extended in the optical axis direction, each of the linear movement guide members having a predetermined length, each of the linear movement guide members also having a side with a plurality of cam surfaces;

a zoom ring having an external periphery with a plurality of male helicoid threads, the male helicoid threads of the zoom ring being engaged with the female helicoid threads of the helicoid ring such that the zoom ring is capable of linearly moving in the optical axis direction by the guidance of the linear movement guide member;

a rear cam combined with the zoom ring, the rear cam capable of rotating and linearly moving in the optical axis direction in accordance with the movement of the helicoid ring;

a rear lens group mounted within the zoom ring, the rear lens group capable of moving in the optical axis direction in synchronization with the rear cam;

a shutter block fixed to the zoom ring to control quantity of light;

a front lens group mounted within the shutter block, the front lens group capable of rotating and linearly moving in the optical axis direction, the front lens group being dynamically connected to the shutter block via a coil spring such that the rotation of the front lens group is defined;

a cam lever provided at an eccentric position of the shutter block, the cam lever capable of repeatedly rotating in a predetermined area in synchronization with the focus cam surface of the guide plate, the cam lever having a first rotating arm contacting the focus cam surface and a second rotating arm, the first rotating arm being smaller than the second rotating arm; and a focus relay lever fixed to the front lens group, the focus relay lever capable of repeatedly moving the front lens group in the optical axis direction by a predetermined distance, the second rotating arm being fixed to the focus relay lever.

7. A camera with a camera body and a zoom lens barrel driving system, the zoom lens barrel driving system comprising:

a motor;

a plurality of power transmitting gears engaged with the motor;

a lens base fixed to the camera body;

a barrel idle gear fixed to the lens base to receive driving power from the motor via the power transmitting gears;

a helicoid ring having an internal periphery with a spiral-shaped focus control groove and a plurality of focus control protrusions formed at the focus control groove, each focus control protrusion having a predetermined height and spaced apart from each other by a predetermined distance, the helicoid ring capable of rotating and linearly moving in the optical axis direction upon receipt of the driving power through the barrel idle gear;

a guide barrel mounted within the helicoid ring, the guide barrel capable of linearly moving in the optical axis direction;

a zoom ring mounted within the guide barrel, the zoom ring capable of rotating relative to the helicoid ring and linearly moving with the guidance of the guide barrel;

a rear lens group combined with the guide barrel and the helicoid ring, the rear lens group capable of moving in the optical axis direction in synchronization with the helicoid ring:

a shutter block fixed to the zoom ring to control quantity of light;

a magnification control unit having a front lens group, the front lens group being combined with the shutter block such that the front lens group is capable of rotating and linearly moving in the optical axis direction;

a first focus cam lever combined with the zoom ring, the first focus cam lever having an end tightly contacting at least one of the focus control groove of the helicoid ring and a combination of the focus control protrusion and a rotation center hole; and a focus control member having a second cam lever, the second cam lever being fixed around the rotation center hole of the first focus cam lever, the second cam lever capable of repeatedly moving the front lens unit in the optical axis direction by a predetermined distance in synchronization with the first focus cam lever.

8. The camera with the zoom lens barrel driving system of claim 7 wherein the front lens group is dynamically connected to the shutter block via an elastic member such that an end portion of the first focus cam lever tightly contacts the focus control groove of the helicoid ring and the focus control protrusion.

9. A camera with a camera body and a zoom lens barrel driving system, the zoom lens barrel driving system comprising:

a motor mounted within the camera body;

a plurality of power transmitting gears connected to the motor;

a lens base fixed to the camera body, the lens base having an internal periphery with a plurality of female helicoid threads and a plurality of linear guide grooves in an optical axis direction;

a barrel idle gear fixed to the lens base, the barrel idle gear being engaged with the neighboring power transmitting gear to receive driving power from the motor via the power transmitting gears;

a helicoid ring having an external periphery with a plurality of male helicoid threads and a plurality of spur gear threads, and an internal periphery with a spiral-shaped focus control groove, the male helicoid threads of the helicoid ring being engaged with the female helicoid threads of the lens base such that the helicoid ring is capable of rotating and linearly moving in the optical axis direction, the spur gear threads being engaged with threads of the barrel idle gear such that the helicoid ring is capable of rotating and linearly moving in the optical axis direction upon receipt of driving power through the barrel idle gear, the spiral-shaped focus control groove having a plurality of focus control protrusions spaced apart from each other by a predetermined distance, each focus control protrusion having a predetermined height;

a guide barrel combined with the helicoid ring, the guide plate capable of rotating relative to the helicoid ring and linearly moving along the linear guide groove of the lens base in the optical axis direction, the guide plate having a front end with a plurality of linear movement guide members extended in the optical axis direction, each linear movement guide member having a predetermined length, each of the linear movement guide members also having a side with a plurality of cam surfaces, the guide barrel having a plurality of front lens unit guide grooves and a plurality of zoom ring guide grooves, the front lens unit guide grooves and the zoom ring guide grooves being extended in the optical axis direction;

a zoom ring having an external periphery with a plurality of guide protrusions, the guide protrusions of the zoom ring being interlocked with the zoom ring guide grooves of the guide barrel such that the zoom ring is capable of linearly moving in the optical axis direction by the guidance of the zoom ring guide protrusion;

a rear lens unit having an external periphery with a plurality of guide protrusions, the guide protrusions of the rear lens unit being interlocked with the rear lens unit guide grooves of the guide barrel, the rear lens unit capable of moving in the optical axis direction in synchronization with the guide barrel and the helicoid ring;

a shutter block fixed to the zoom ring to control quantity of light;

a front lens unit combined with the shutter block, the front lens group capable of rotating and linearly moving in the optical axis direction;

a first focus cam lever provided at an internal periphery of the zoom ring, the first focus cam having an end portion tightly contacting the focus control groove of the helicoid ring and the focus control protrusion such that the first focus cam is capable of repeatedly moving in a predetermined area;

a second focus cam lever fixed around the rotation center hole of the first focus cam, the second focus cam lever capable of rotating in synchronization with the rotation of the first focus cam lever; and a torsion spring dynamically interconnecting the second focus cam lever and the front lens unit to apply the rotational power of the second focus cam lever to the front lens unit such that the front lens unit is capable of repeatedly moving between a near focal position and a infinite focal position.

10. The camera with a zoom lens barrel driving system of claim 9 wherein a tension coil spring interconnects the front lens unit and the shutter block such that the tensional coil spring defines the rotation of the front lens unit.

11. A camera with a camera body and a zoom lens barrel driving system, the zoom lens barrel driving system comprising:

a motor;

a plurality of power transmitting gears engaged the motor;

a lens base fixed to the camera body;

a barrel idle gear fixed to the lens base to receive driving power from the motor via the power transmitting gears;

a helicoid ring mounted within the lens base, the helicoid ring capable of rotating and linearly moving in the optical direction upon receipt of the driving power through the barrel idle gear;

a one-directional focus control unit formed at an internal periphery of the helicoid ring, the focus control unit capable of performing a focus controlling operation only when the helicoid ring moves forward to an object side;

a linear movement guide plate mounted within a film side of the helicoid ring, the linear movement guide plate capable of linearly moving in the optical axis direction;

a zoom ring mounted within the helicoid ring, the zoom ring capable of linearly moving in the optical axis direction by the guidance of the guide plate while rotating relative to the helicoid ring;

a rear lens frame mounted within the helicoid ring, the rear lens frame capable of moving in the optical axis direction in synchronization with the helicoid ring;

a shutter block fixed to the zoom ring to control quantity of light;

a front lens frame mounted within the shutter block, the front lens frame capable of rotating and linearly moving in the optical axis direction; and a focus control power transmitting unit combined with the zoom ring, the focus control power transmitting unit capable of moving the front lens frame in the optical axis direction in synchronization with the focus control unit by using relative rotations of the zoom ring and the helicoid ring.

12. The camera with the zoom lens barrel driving system of claim 11 wherein the focus control power transmitting unit comprises a first focus control lever having an end fixed to the zoom ring, an opposite end tightly contacting the one-directional focus control unit and a rotation center hole, and a second focus control lever fixed around the rotation center hole of the first focus cam lever, the second focus control lever capable of moving in synchronization with the first focus control lever such that the front lens unit is capable of repeatedly moving in the optical axis direction by a predetermined distance.

13. The camera with the zoom lens barrel driving system of claim 12 wherein the one-directional focus control unit comprises a spiral-shaped groove and a plurality of protrusions equidistantly formed at the groove, each of the protrusions having a relatively large inclined side and a relatively small inclined side, the relatively large inclined side being capable of performing the focus controlling operation in case the first focus control lever rotates in a forward direction.

* * * * *

UNITED STATES PATENT AND TRADEMARK OFFICE
CERTIFICATE OF CORRECTION

PATENT NO.   : 6,240,254 B1
DATED        : May 29, 2001
INVENTOR(S)  : Mun et al.

Page 1 of 1

It is certified that error appears in the above-identified patent and that said Letters Patent is hereby corrected as shown below:

<u>Title page,</u>
Item [30], Foreign Application Priority Data,
Line 1, "Jul. 9, 1998" should read -- Sept. 7, 1998 --.

<u>Column 17,</u>
Line 29, "a" should read -- an --;
Line 32, "members" should read -- member --.

<u>Column 18,</u>
Line 12, "The" should read -- A --.

<u>Column 20,</u>
Line 3, "with" should read -- having --.

<u>Column 21,</u>
Line 15, "a" should read -- the --;
Line 16, "tension" should read -- tensional --;
Line 23, "engaged" should read -- connected to --.

Signed and Sealed this

Nineteenth Day of February, 2002

Attest:

*Attesting Officer*

JAMES E. ROGAN
*Director of the United States Patent and Trademark Office*